United States Patent
Fujimura et al.

(10) Patent No.: US 7,242,363 B2
(45) Date of Patent: Jul. 10, 2007

(54) ANTENNA ELEMENT AND ANTENNA MODULE, AND ELECTRONIC EQUIPMENT USING SAME

(75) Inventors: Munenori Fujimura, Miyazaki (JP); Shuichiro Yamaguchi, Miyazaki (JP); Hiromi Tokunaga, Miyazaki (JP); Kazuhiro Eguchi, Miyazaki (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 97 days.

(21) Appl. No.: 10/819,259

(22) Filed: Apr. 7, 2004

(65) Prior Publication Data
US 2004/0201531 A1 Oct. 14, 2004

(30) Foreign Application Priority Data
Apr. 10, 2003 (JP) ............................. 2003-106412
Apr. 11, 2003 (JP) ............................. 2003-107620
Jun. 2, 2003 (JP) ............................. 2003-156419

(51) Int. Cl.
*H01Q 1/36* (2006.01)
*H01Q 21/00* (2006.01)
(52) U.S. Cl. ...................................... 343/853; 343/895
(58) Field of Classification Search ................ 343/702, 343/895, 739, 700 MS, 853
See application file for complete search history.

(56) References Cited

U.S. PATENT DOCUMENTS

| | | | |
|---|---|---|---|
| 4,309,707 A | 1/1982 | James et al. .................. | 343/895 |
| 5,406,295 A | 4/1995 | Baranski et al. | |
| 5,561,430 A | 10/1996 | Knebelkamp ................ | 342/44 |
| 5,644,321 A | 7/1997 | Benham | |
| 5,764,197 A | 6/1998 | Tsuru et al. ................. | 343/895 |
| 5,898,413 A | 4/1999 | Mandai et al. ............... | 343/895 |
| 5,903,242 A | 5/1999 | Tsuru et al. ................. | 343/873 |
| 5,914,693 A | 6/1999 | Takei et al. .................. | 343/767 |
| 5,936,593 A | 8/1999 | Mandai et al. ............... | 343/895 |
| 5,949,385 A | 9/1999 | Asakura et al. .............. | 343/895 |
| 5,973,651 A | 10/1999 | Suesada et al. .............. | 343/752 |
| 5,977,927 A | 11/1999 | Mandai et al. ............... | 343/788 |
| 6,028,554 A | 2/2000 | Mandai et al. ......... | 343/700 MS |
| 6,054,956 A | 4/2000 | Mandai et al. ............... | 343/702 |
| 6,064,351 A | 5/2000 | Mandai et al. ............... | 343/873 |
| 6,181,001 B1 | 1/2001 | Ikefuji et al. ................ | 257/679 |
| 6,288,680 B1 | 9/2001 | Tsuru et al. ................. | 343/702 |

(Continued)

FOREIGN PATENT DOCUMENTS

EP 1 079 463 2/2001

(Continued)

*Primary Examiner*—Michael C. Wimer
(74) *Attorney, Agent, or Firm*—Wenderoth, Lind & Ponack, L.L.P.

(57) ABSTRACT

An antenna element, an antenna module, and an electronic equipment using these, are small-sized, high in transmitting and receiving performance, and capable of transmitting and receiving electric waves at a plurality of frequencies. The antenna element includes two antennas having at least a feeder portion and an open portion, and current is fed to each feeder portion. The antenna module includes at least an antenna and a mounting body in which the antenna is mounted, and current is fed to each feeder portion. The electronic equipment includes at least the antenna element or antenna module, a signal modulator, a signal demodulator, a controller, a man-machine interface, and a casing.

11 Claims, 25 Drawing Sheets

U.S. PATENT DOCUMENTS

| | | |
|---|---|---|
| 6,300,913 B1 | 10/2001 | Davidson |
| 6,380,900 B1 | 4/2002 | Kanayama |
| 6,486,853 B2 | 11/2002 | Yoshinomoto et al. ..... 343/895 |
| 6,501,438 B2 | 12/2002 | Nevermann et al. |
| 2001/0005183 A1 | 6/2001 | Nevermann et al. |
| 2002/0063658 A1 | 5/2002 | Washiro et al. ...... 343/700 MS |
| 2003/0011532 A1 | 1/2003 | Yoshinomoto et al. ..... 343/895 |
| 2004/0001031 A1 | 1/2004 | Sugimoto et al. |

FOREIGN PATENT DOCUMENTS

| | | |
|---|---|---|
| EP | 1 137 101 | 9/2001 |
| EP | 1 367 671 | 12/2003 |
| JP | 5-13291 | 1/1993 |
| JP | 5-226926 | 9/1993 |
| JP | 8-296354 | 11/1996 |
| JP | 9-64627 | 3/1997 |
| JP | 9-69715 | 3/1997 |
| JP | 9-74309 | 3/1997 |
| JP | 9-74312 | 3/1997 |
| JP | 9-223908 | 8/1997 |
| JP | 9-232828 | 9/1997 |
| JP | 10-065432 | 3/1998 |
| JP | 10-200438 | 7/1998 |
| JP | 10-247806 | 9/1998 |
| JP | 11-004117 | 1/1999 |
| JP | 3011075 | 12/1999 |
| JP | 2001-326522 | 11/2001 |
| JP | 2002-124812 | 4/2002 |
| JP | 2002-170716 | 6/2002 |
| JP | 2002-217627 | 8/2002 |
| JP | 2002-217629 | 8/2002 |
| JP | 2003-163521 | 6/2003 |
| WO | 98/15031 | 4/1998 |
| WO | 00/54366 | 9/2000 |

| | Radiation power |
|---|---|
| Conventional system | 0.63W |
| Present invention | 0.68W |

ANTENNA ELEMENT AND ANTENNA MODULE, AND ELECTRONIC EQUIPMENT USING SAME

FIELD OF THE INVENTION

The present invention relates to an antenna element and antenna module which are used in electronic equipment for mobile communication and wireless communication such as personal computers, and electronic equipment using the same.

BACKGROUND OF THE INVENTION

Portable terminals, such as portable telephones, having a whip antenna or a built-in antenna, and, in addition to these antennas, mounted with an antenna element for wireless data communication with other electronic equipment are increasing.

Also, portable mobile electronic equipment, such as notebook personal computers, for wireless data communication are increasing, and those mounted with an antenna in the electronic equipment are also increasing.

As the above-mentioned antenna element, there is an antenna element having a helical conductor on a prism-like insulating substrate, of which both ends are terminals and one of the terminals serves as a feeder terminal (e.g., refer to Japanese Laid-open Patent 2001-326522). In this case, $\lambda/4$ type antenna is often used for reducing the mounting area ($\lambda$ is wavelength of transmit-receive electric waves). FIG. 36 is a perspective view of an antenna element in the prior art. Substrate 104 is made from a square insulating material such as ceramic, and there are provided terminals 101 and 102 at the ends thereof. A signal source is connected to one of the terminals 101 and 102. Helical conductor 103 is formed by winding a copper wire or the like or trimming the conductive surface plated on the substrate 103. Since such antenna element can be very much reduced in size, it can be easily mounted inside or outside a portable terminal.

Here, the $\lambda/4$ type antenna operates with image current generated on a ground surface of a conductor existing in its vicinity. Therefore, it is most desirable to install the antenna element in a direction vertical to the ground surface.

FIG. 37 is a diagram of the relationship between the antenna element and the ground surface in the prior art, and shows the relationship between the $\lambda/4$ type antenna and an image current generated on the ground surface. The current is supplied to $\lambda/4$ type antenna 110 via feeder line 112. Current I flows in the $\lambda/4$ type antenna 110, and image current I' flows in the ground surface 111. The image current I' is generated in the direction of current I as shown in FIG. 37 and serves for increasing the gain of transmitting and receiving operation at the $\lambda/4$ type antenna 110. In this way, since the conductor is installed vertical to the ground surface 111, the $\lambda/4$ type antenna 110 is optimized in its transmitting and receiving operation.

However, when a conventional antenna element is mounted inside or outside a portable terminal, there may often exist various conductors in the vicinity of the antenna element. There are conductors such as a casing, other parts, and a substrate, which may sometimes exist almost in parallel with the antenna. Such conductors are often connected to the ground and become a ground surface.

Thus, when the antenna element is placed substantially parallel with metallic parts, image current flowing in a direction opposite to the current flowing in the antenna element is generated on the conductor being the ground surface. In case such an image current is generated, a force is generated to cancel the current flowing on the antenna element, causing the gain at the antenna element to be decreased. Naturally, even in a case of not being placed in substantially parallel fashion, if the antenna element is not installed substantially vertical to the ground surface, a force is similarly generated to decrease the gain due to image current. With the miniaturization and further integration of electronic equipment such as portable terminals, it has recently become more and more difficult to install an antenna element in the best conditions. Also, for installing the antenna element in best conditions, it is necessary to assure that there is a sufficient mounting zone and there arises a problem of increase in size of the electronic equipment.

Further, when a conductor exists in the vicinity of the antenna element, the directionality of the conductor affects the directionality of the antenna element and there is a problem of lowering of transmitting-receiving performance of the antenna element.

SUMMARY OF THE INVENTION

An antenna element comprises two antennas respectively having a feeder portion and an open portion, wherein current is fed to each feeder portion.

An antenna module comprises: two antennas respectively having a feeder portion and an open portion; and a mounting body in which the two antennas are mounted with a conductor formed on at least a part thereof, wherein current is fed to each feeder portion.

An antenna module comprises two antennas, wherein any one of open portions of the two antennas is formed with an additional conductor.

An antenna module comprises: two antennas respectively having a feeder portion and an open portion; and a mounting body including a conductor having an opening, wherein the two antennas are mounted in the mounting body within one of an opening interior and a zone vertically formed by the opening.

An antenna module comprises: an antenna having a feeder portion and an open portion; a sub-conductor having a feeder portion which is disposed at an angle to the antenna; and a mounting body for mounting the antenna and the sub-conductor, wherein the antenna and the sub-conductor are supplied with current in common.

An antenna module comprises: a substrate, and a helical antenna having a feeder portion, an open portion and a helical conductor, which is installed on the substrate; and a mounting body including a conductor having an opening, wherein the helical antenna is mounted in the mounting body within one of an opening interior and a zone vertically formed by the opening.

Electronic equipment comprises: two antennas respectively provided with a feeder portion and an open portion, wherein each feeder portion comprises an antenna element; a signal modulator for modulating transmitting signals; a signal demodulator for demodulating receiving signals; and a controller for controlling processing operation at one of at least the signal modulator and the signal demodulator which are supplied with current in common; a man-machine interface for command exchanging and displaying; and a casing for storing at least the antenna element, the signal modulator, the signal demodulator, and the controller.

Electronic equipment comprises: an antenna provided with a feeder portion and an open portion; a sub-conductor having a feeder portion which is disposed at an angle to the antenna; a signal modulator for modulating transmitting signals; a signal demodulator for demodulating receiving signals; a controller for controlling processing operation at one of at least the signal modulator and the demodulator; a man-machine interface for command exchanging and displaying; a casing for storing at least the antenna, the signal modulator, the signal demodulator, and the controller; and a mounting body in which the antenna and the sub-conductor which are formed in a part of the casing are housed.

DETAILED DESCRIPTION OF THE EXEMPLARY EMBODIMENTS

Preferred Embodiment 1

FIG. 1, FIG. 2, FIG. 3, FIG. 4, FIG. 5A, FIG. 5B, and FIG. 6 are the configuration diagrams of an antenna element in the preferred embodiment 1 of the present invention.

First, each component will be described.

Figure 2:
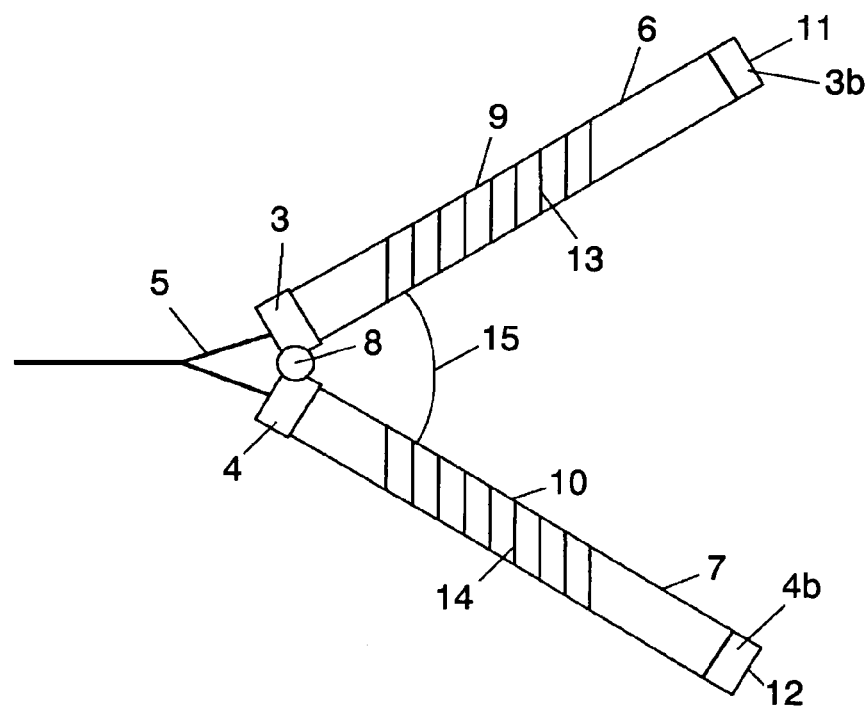
FIG. 2 is a configuration diagram of an antenna element in the preferred embodiment 1 of the present invention.

As antennas 1, 2, as shown in FIG. 2, rod antennas, conductor antennas, pattern antennas, and plane antennas as well as helical antennas 6, 7 are employed. From the viewpoint of miniaturization and higher accuracy, it is preferable to employ helical antennas using the resonance frequency determined depending upon the inductor component generated by helical conductors 9, 10 and the capacity component generated by the other portions.

The helical antennas 6, 7 comprise substrates 11, 12 and helical conductors 9, 10. The helical conductors 9, 10 are realized when trimming grooves 13, 14 are formed by trimming conductive layers formed on the surfaces of the substrates 11, 12 by means of laser. Or, the helical conductors 9, 10 are realized when conductive wires are wound on the substrates 11, 12 and both ends thereof are respectively connected to feeder portions 3, 4 and open portions 3b, 4b.

The feeder portions 3, 4 feed signal current to the antennas 1, 2 (or helical antennas 6, 7). Also, the feeder portions 3, 4 transmit induced current generated on the antennas 1, 2 (or helical antennas 6, 7) to the receiver. Also, to the feeder portions 3, 4, it is preferable to make direct connection to feeder line 5, and also to make the connection to a feeding land formed on a mounting body such as a substrate.

Also, common feeder line 5 is connected to the feeder portions 3, 4, and common signal current is fed thereto in common.

The open portions 3b, 4b are formed at the ends opposite to the feeder portions 3, 4 of the antennas 1, 2 (or helical antennas 6, 7) and are in a state of being open without being connected to a signal line. The open portions 3b, 4b are preferably connected to an independent mounting land formed on a mounting body such as a substrate.

The feeder line 5 is the cable conductor of a coaxial cable, a line pattern on a substrate, or other conductor line.

Rotary shaft 8 rotatably connects one end of each of the antennas 1, 2 (or helical antennas 6, 7) to each other, and the angle 15 of the antennas 1, 2 (or helical antennas 6, 7) fulcrumed on the rotary shaft 8 is varied. As the rotary shaft 8, a small hinge or the like, for example, is employed. The "angle" is a cross angle of the antennas, and it is referred to as "angle" for the cross angle hereafter.

The angle 15 is preferably a proper angle, preferably in a range of 5 degrees to 90 degrees, and more preferably, 5 degrees to 60 degrees.

Incidentally, it is preferable to form the antenna element with the predetermined angle kept as it is without using the rotary shaft 8.

The helical conductors 9, 10 are disposed on the substrates 11, 12. The helical conductors 9, 10 are formed by the trimming grooves 13, 14 formed in the substrates 11, 12 and conductive wires wound on the substrates 11, 12. At the helical conductors 9, 10, an inductor component is generated due to the existence of grooves wound thereon.

Phase shifter 16 serves to shift the phase of signal current fed from the signal line 5, and at the phase shifter 16, the phases of signals respectively input to the two antennas 1, 2 (or helical antennas 6, 7) are shifted to phases different from each other. Thus, it is possible to make the antenna 1 (or helical antenna 6) and the antenna 2 (or helical antenna 7) different in voltage distribution and current distribution from each other. In this way, as described later, it becomes possible to increase the potential difference generated between the antenna 1 (or helical antenna 6) and the antenna 2 (or helical antenna 7) and to increase the potential vertically generated between the antennas, thereby enabling the improvement of transmitting and receiving gains.

Sub-conductor 17 replaces one of the antennas 1, 2 (or helical antennas 6, 7), and it is not always required to serve as an antenna that realizes a desired transmitting and receiving frequency.

The sub-conductor 17 is supplied with voltage from the feeder line 5 via the feeder portion 4. The antenna element of the present invention aims at generating a new electric field due to the level difference in electric field between the two antennas by feeding to each of the two antennas. Accordingly, a similar purpose can be achieved at the sub-conductor 17. Applying a current to the sub-conductor 17 causes an electric field to be generated, and when the electric field is different in level from the electric field of antenna 6, a new electric field can be generated. This is, for example, a level difference due to phase difference. The sub-conductor 17 is preferable to be formed of a conductor or a metallic bar. Also, when the antenna element is disposed on a substrate, the sub-conductor 17 is preferably formed of a line pattern on the substrate or a solder portion disposed on the substrate. Also, the sub-conductor 17 is preferably rectangular or cylindrical instead of being bar-like, and also preferably circular or oval in shape. Also, the sub-conductor 17 is preferably connected to one of the antennas, and also preferably disposed apart therefrom.

Next, the helical antennas 6, 7 will be further described in detail.

The substrates 11, 12 of the helical antennas are formed by press machining, extrusion molding or the like, of an insulator or dielectric such as alumina or ceramic material based on alumina. As the component materials for substrates 11, 12, it is preferable to use ceramic materials such as forsterite, magnesium titanate-based, calcium titanate-based, zirconia-tin-titanium-based, barium titanate-based, and lead-calcium-titanium-based materials, and also preferable to use resin material such as epoxy resin. In the preferred embodiment 1, from the viewpoint of strength, insulation or machining convenience, alumina or ceramic material based on alumina is used as the component material for substrates 11, 12. Further, the substrates 11, 12 are entirely coated with a conductive layer in a single or multiple layers formed from a conductive material such as copper, silver, gold, nickel or the like, forming a surface having conductivity.

Incidentally, each edge of the substrates 11, 12 is chamfered. Chamfering is effective to prevent the substrate 1 from cracking.

The feeder portions 3, 4 are respectively formed at the ends of substrates 11, 12. The substrates 11, 12 preferably have a cross-section that is the same size as the end portions 3, 4, but it is also preferably stepped, and the sectional area of the substrate 11, 12 becomes smaller than the sectional area of the feeder portion 3, 4. Since the outer periphery of the substrate 11 is stepped, the substrates 11, 12 are able to maintain a distance from the surface of the electronic board when the antenna element is mounted on an electronic board. Accordingly, it is possible to prevent the deterioration of characteristics. Or, it is also possible to prevent damage in the mounting operation. In this case, the substrates 11, 12 are preferably stepped only partially or over the entire surfaces. When stepped over the entire surfaces, it is not necessary to take care in selecting a surface coming in contact with the electronic board in the mounting operation, making it possible to reduce the cost required for mounting. Further, the cross-section of substrate 11, 12 after being stepped is preferably square or polygonal, such as a triangle and a pentagon, and also preferably generally circular or oval in shape.

Although it is not shown, the substrates 11, 12 are also preferably coated with a protective layer so as to cover at least the helical conductors 9, 10. As a result, there will be no variation of the resonance frequency or damage to the antenna element due to intrusion of dust or the like into the trimming grooves 13, 14. Also, it is possible to enhance the endurance and weather resistance. Also, such a protective layer is preferably formed excluding the feeder portions 3, 4 and open portions 3b, 4b. Also, in the case of substrates 11, 12 being stepped, if the protective layer is formed so as to fill up the difference caused due to the step, it will bring about a merit such that the element is free from floating in the mounting operation. It is preferable to use a coating material for forming the protective layer and also preferable to form it by thermally shrinking a tube-like protective layer.

For the feeder portions 3, 4, at least one of a thin film such as conductive plated layer, evaporated layer, sputtered layer or the like and a layer formed by applying and burning silver paste or the like is used.

The trimming grooves 13, 14 are formed by trimming the surface of substrate 11, 12 by means of a laser or by winding a wire such as a copper wire having conductivity. The helical conductors 9, 10 generate inductor component L, and the other portions of substrates 11, 12 generate capacity component C. With voltage applied, the resonance condition "$1/\sqrt{LC}$" is satisfied, and it becomes possible to transmit and receive electric waves at the resonance frequency in accordance with the resonance condition.

Next, various embodiments of the antenna element will be described with reference to FIG. 1 to FIG. 5.

Figure 1:
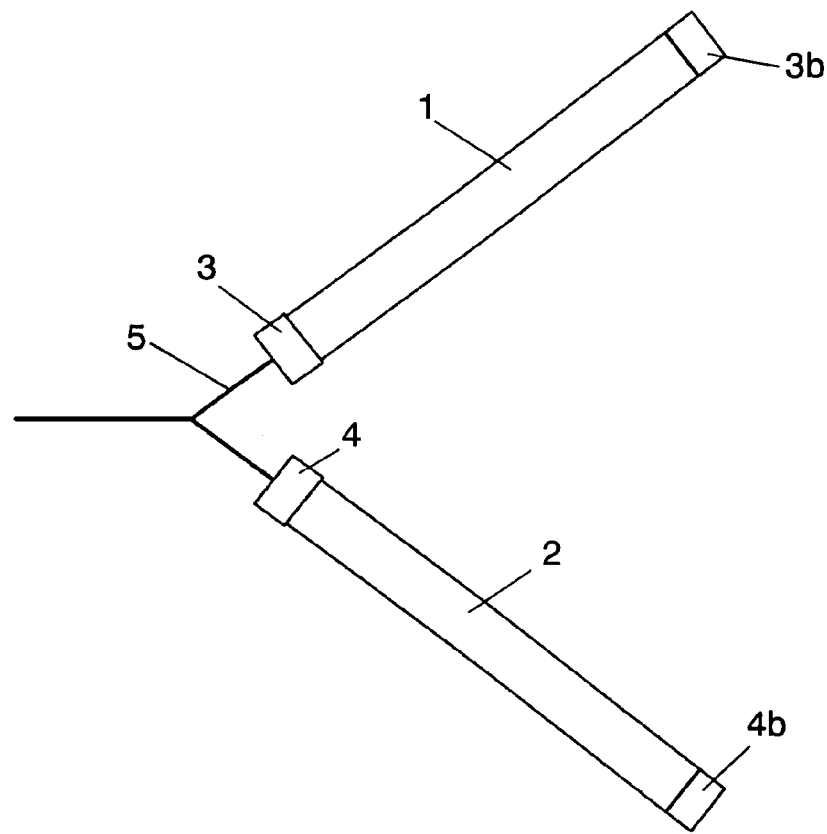
FIG. 1 is a configuration diagram of an antenna element in the preferred embodiment 1 of the present invention.

In FIG. 1, antennas 1, 2 of conductive antennas respectively fulcrumed on the ends thereof are disposed at angle 15 to each other. The antennas 1, 2 are preferably formed of conductive antennas, rod antennas, plane antennas, pattern antennas or the like, and current is applied in common to the feeder portions 3, 4 of the two antennas 1, 2 via the feeder line 5.

In FIG. 2, the antennas 1, 2 are helical antennas 6, 7. Since the antennas 1, 2 are helical antennas 6, 7, the antenna length can be shortened, and the whole of the antenna element can be further reduced in size. Also, since the helical conductors 9, 10 are formed by trimming grooves, the inductor component and capacity component can be accurately generated, and it is possible to realize a resonance frequency with very high accuracy.

Figure 3:
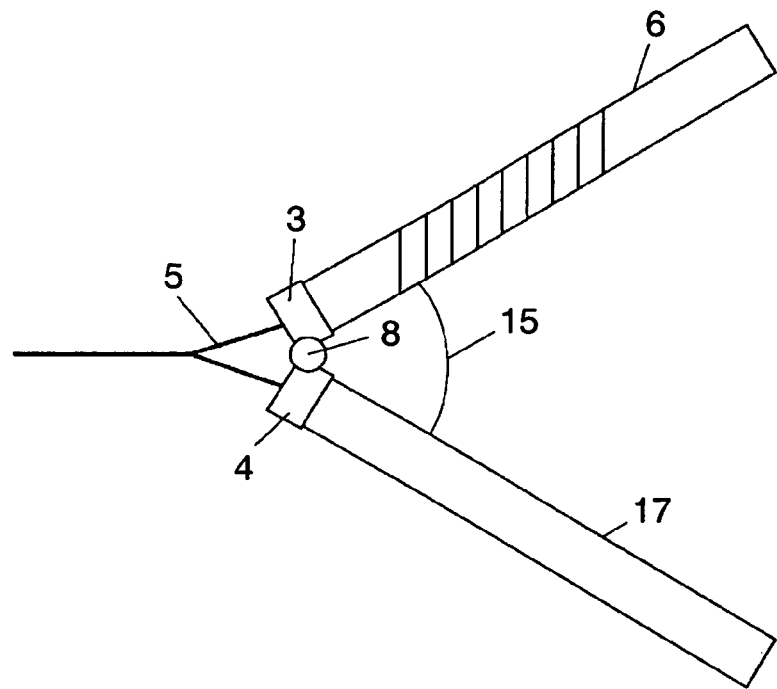
FIG. 3 is a configuration diagram of an antenna element in the preferred embodiment 1 of the present invention.

In FIG. 3, the antenna 2 is replaced by the sub-conductor 17. The sub-conductor 17 is preferably formed from a substrate pattern or conductive material, and its length is not required to be in accordance with the wavelength of transmitting and receiving signals. As described later, since it is necessary to sufficiently generate vertical electric field between the sub-conductor 17 and antenna 1 (or helical antenna 6), the sub-conductor 17 is preferably supplied with a current, generating voltage distribution. Also, the length of sub-conductor 17 is preferred to be nearly the same as that of the antenna 1 (or helical antenna 6), and the ends are preferred to be at nearly the same positions as vertically viewed.

As shown in FIG. 3, since the sub-conductor 17 is employed, it becomes possible to comprise only one antenna, and it brings about a merit such that the miniaturization and cost reduction of the antenna element can be promoted.

Figure 4:
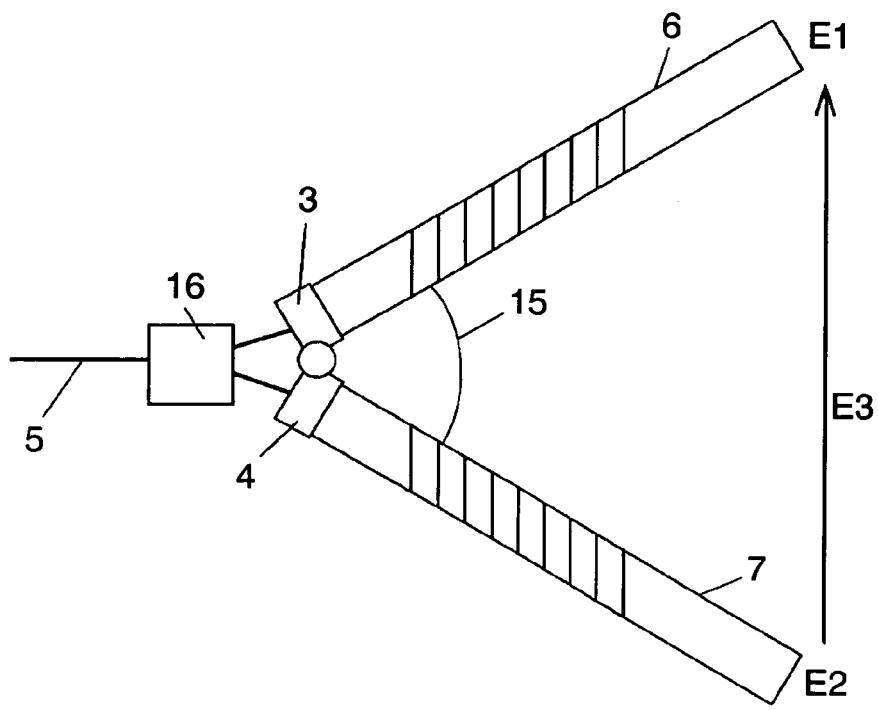
FIG. 4 is a configuration diagram of an antenna element in the preferred embodiment 1 of the present invention.

In FIG. 4 is shown an antenna of which the phases of the signals fed to antennas 1, 2 (or helical antennas 6, 7) or sub-conductor 17 are shifted via phase shifter 16 to make them different from each other.

The phase shifter 16 divides, for example, the phase of signal current into the one shifted by 90 degrees and the one not shifted. The antenna 1 (or helical antenna 6) is supplied with a signal current with the phase shifted, and the antenna 2 (or helical antenna 7, or sub-conductor 17) is supplied with a signal current with the phase shifted. In this way, there arises a difference in voltage distribution, causing a potential to be generated between the antennas.

Figure 5A:
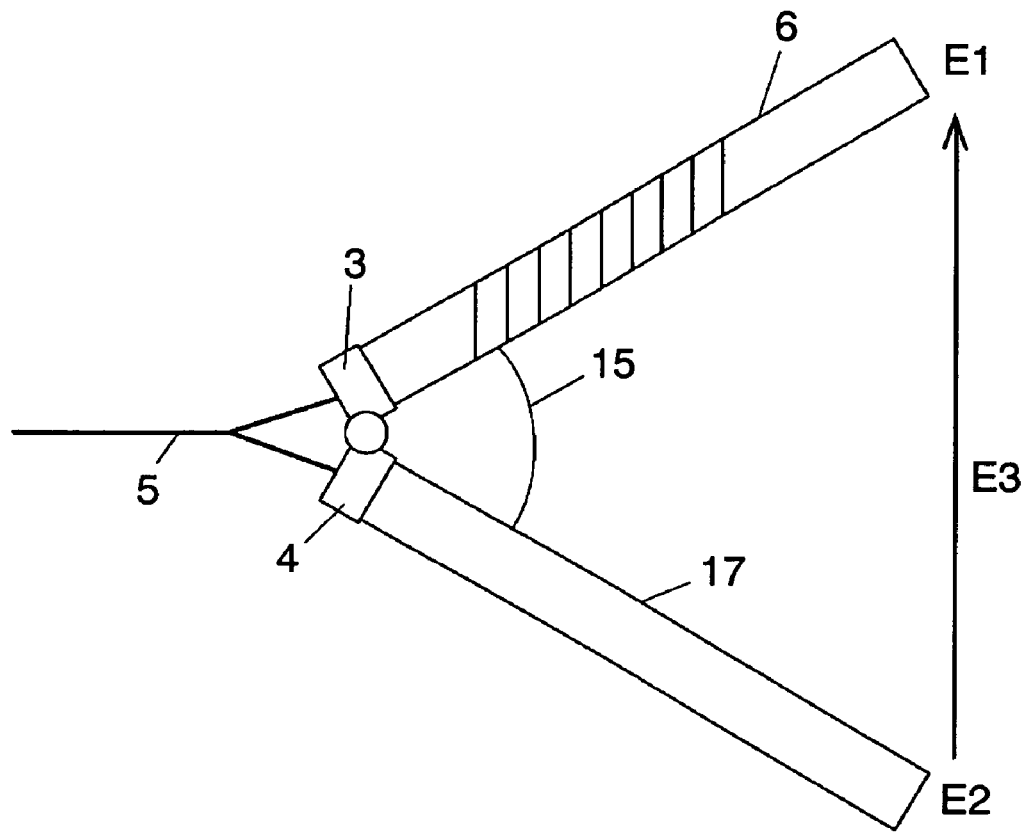
FIG. 5A is a configuration diagram of an antenna element in the preferred embodiment 1 of the present invention.

In FIG. 5A is shown an antenna formed of sub-conductor 17 with one end connected rotatably and helical antenna 6, which are nearly the same in length.

Figure 5B:
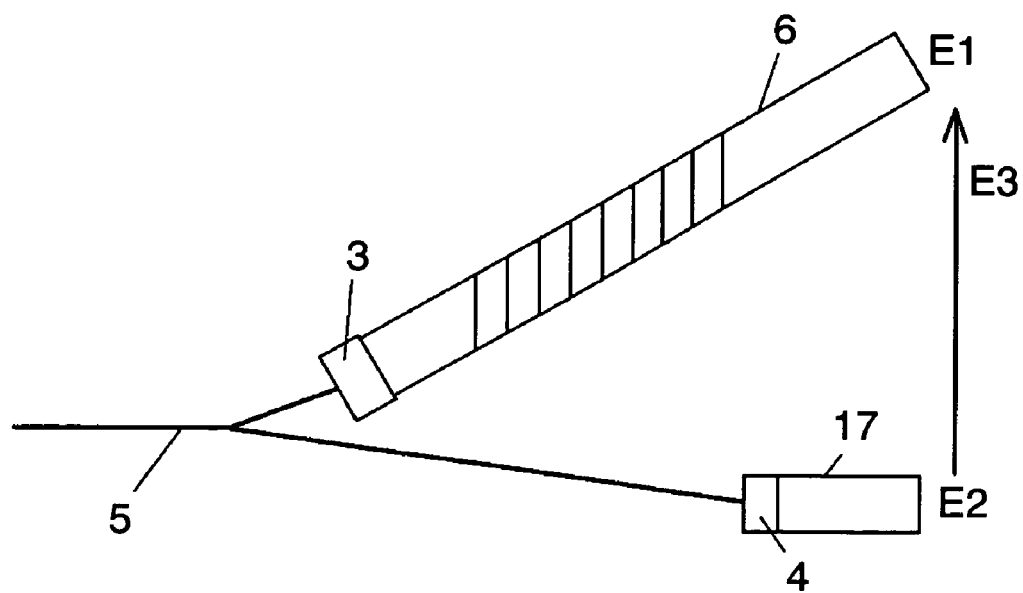
FIG. 5B is a configuration diagram of an antenna element in the preferred embodiment 1 of the present invention.

In FIG. 5B, the sub-conductor 17 is shorter than the antenna 6, but their ends exist nearly at the same positions.

Figure 6:
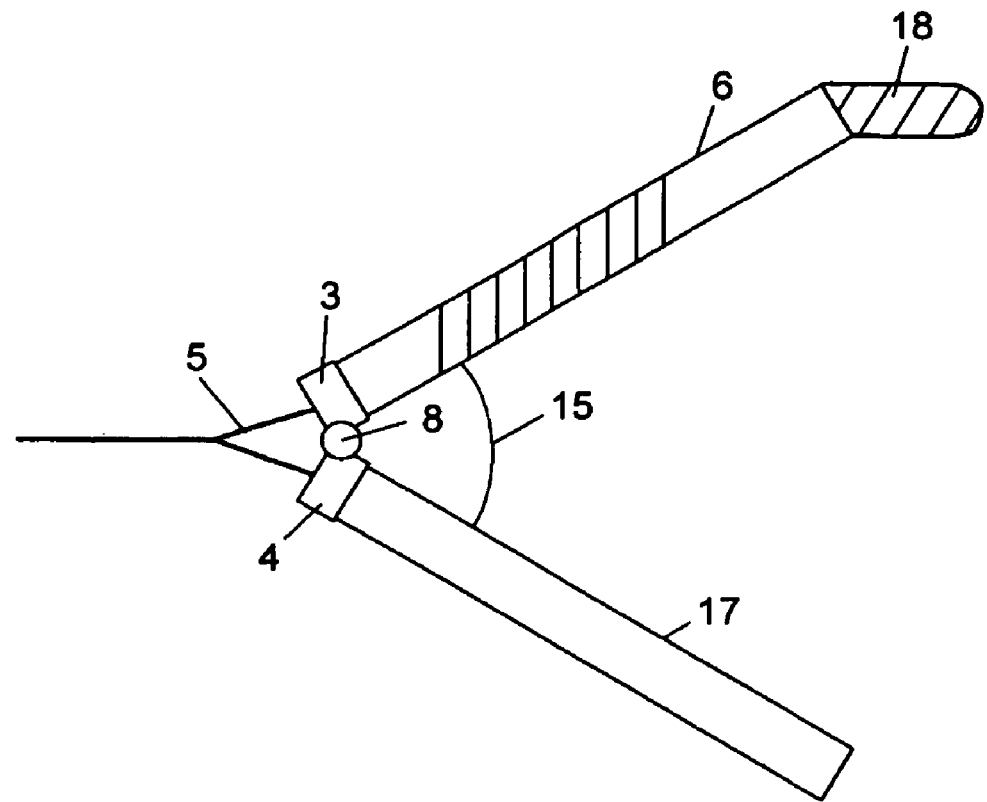
FIG. 6 is a configuration diagram of an antenna element in the preferred embodiment 1 of the present invention.

In FIG. 6, additional conductor 18 is formed at the end of the antenna 1, 2 (or helical antenna 6, 7). Due to the additional antenna 18, the transmitting and receiving zone is expanded, making the antenna element suitable for realizing data communication in large quantity.

The operation of the antenna element and the technical merits of the antenna element of the present invention will be described in the following.

First, the generation of electric field E3 between the antennas 1, 2 (or helical antennas 6, 7, or helical antenna 6 and sub-conductor 17) is described with reference to FIG. 4 and FIGS. 5A and 5B.

In FIG. 4, the phases of current input from the feeder line 5 to the helical antenna 6 and helical antenna 7 through the phase shifter 16 are different from each other. Accordingly, current being same in level but different in phase flows to the helical antennas 6, 7. Electric field E1 is an electric field generated at the helical antenna 6, and electric field E2 is an electric field generated at the helical antenna 7. Because of being different in phase, the levels of both electric fields are different from each other at the corresponding positions of the helical antennas 6, 7. Electric field E3 is an electric field generated due to the phase difference and level difference between the electric field E1 and the electric field E2, and it is generated from the helical antenna 7 toward the helical antenna 6. Usually, where two electric fields are generated, no electric field is newly generated between them in the case where the electric fields are the same in level, but in the case where the two electric fields are different in level, a new electric field is generated due to the difference. Accordingly, the electric field E3 is an electric field newly generated due to the action, and in FIG. 4, the current input to the helical antennas 6, 7 is shifted to become different in phase, changing the levels of electric field E1 and electric field E2, and causing the electric field E3 to be generated. In this case, if the phase is changed causing the directionality of the level difference to be changed, the electric field E3 will be generated in the opposite direction.

In FIG. 5A, sub-conductor 17 is used in place of antenna 2 (or helical antenna 7), and the phase shifter 16 is not used.

Current being same in phase and different in level is input from the feeder line 5 to the helical antenna 6 and sub-conductor 17. In this case, in the helical antenna 6, the actual conductor length is different from the electrical length. Accordingly, the current phase at the end portion of the helical antenna 6 differs from the current phase at the end portion of the sub-conductor 17. As a result, the level of electric field E1 generated at the helical antenna 6 becomes different from the level of electric field E2 generated at the sub-conductor 17, causing the electric field E3 to be generated between the helical antenna 6 and the sub-conductor 17.

Even in the case of antennas 1, 2 (or helical antennas 6, 7), the phase difference of the flowing current can be generated by changing the respective inductor conditions or the like. In this way, it becomes possible to make the electric field E1 and the electric field E2 different in level and to make possible the new generation of electric field E3. Naturally, it is also preferable to positively change the phase by using the phase shifter 16.

Also, as shown in FIG. 5B, even when the conductor length of the sub-conductor 17 is shorter than the length of the helical antenna 6, the electric field E3 is generated. In this case, it is preferable to make the end of the sub-conductor 17 nearly same in position as the end of the helical antenna 6 for the purpose of realizing the electric field E3 by more intensely generating an electric field difference.

Here, when the electric field E1 is maximum and the electric field E2 is minimum, electric field E3 is generated from the helical antenna 7 (or sub-conductor 17 or antenna 2) toward the helical antenna 6 (or antenna 2), and when the electric field E1 is minimum and the electric field E2 is maximum, the electric field E3 is generated in opposite direction. Usually, since AC signal current flows, the direction of the electric field E3 varies according to the current flowing direction.

Incidentally, similar effects can be obtained irrespective of whether the sub-conductor 17 is smaller or larger than the helical antenna 6 and whether the shape is square or oval instead of being bar-like.

Next, due to the generation of such electric field E3, even in the case where a conductor such as metal exists in the vicinity of the antenna element, it is possible to prevent the transmitting and receiving gains from being lowered, thereby further improving the transmitting and receiving gains. The mechanism will be described with reference to FIG. 7 and FIG. 8.

Figure 7:
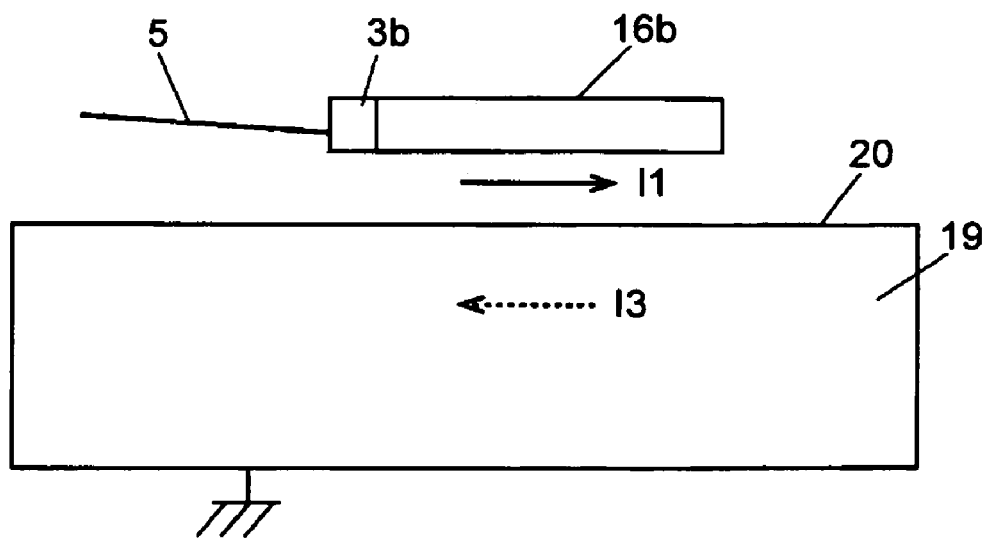
FIG. 7 is a schematic diagram showing the problem of a conventional antenna element.

FIG. 7 is a schematic diagram showing the problem of a conventional antenna element, that is, a state of being affected by image current at the conductor.

Single antenna 16b is supplied with current fed from feeder line 5 via feeder portion 3b, and the current I1 flows into the single antenna 16b. Conductor 19 is, for example, a part of a metallic plate or electronic board and the like which exists in electronic equipment with an antenna element built in. The single antenna 16b is installed in substantially parallel relation with the end surface 20 of the conductor.

Usually, in order to realize the miniaturization of electronic equipment, an antenna element is mounted at the end of the substrate mounted with various electronic elements in many cases. For example, in the case where the electronic equipment is a portable telephone, the antenna element is fitted to the end of the mounting substrate stored therein in many cases. For realizing the reduction in lengthwise size of portable telephones, the lengthwise direction of the single antenna 16b is positioned lateral to the end surface 20, substantially parallel thereto in particular, in many cases. Or, in the case where the electronic equipment is a notebook personal computer, an antenna element is mounted at the peripheral edge portion of the casing in many cases. For example, an antenna element is mounted on a mounting area provided at the peripheral edge portion of main body, or an antenna element is mounted on a mounting area provided at the peripheral edge portion of a cover portion also used as a display section in many cases. Also in this case, there exits an electronic board or a metal plate for assuring the strength at the inner side of the peripheral edge portion in many cases, which is positioned lateral to the end surface 20 of such conductor, substantially parallel thereto in particular, in many cases.

In the case of such mounting, there arises the following problems.

When there is a ground (hereinafter called GND) in the vicinity of the antenna, it can be considered that remote electric waves are composite waves of electric waves reflected from the antenna and electric waves reflected from GND. In this case, the description may be simplified by using a concept such that reflected electric waves are image current and understanding that the electric waves are those radiated from the image current. Image current I3 generated at metal portion 19 is generated at the single antenna 16b in the direction opposite to the current I1. At the single antenna 16b, the image current I3 produces a force that blocks the current I1 flowing in the single antenna 16b, causing the level of the current I1 flowing in the single antenna 16b to be lowered. As a result, the transmitting and receiving gains at the single antenna 16b are reduced.

To prevent this, it is necessary to mount the single antenna 16b in substantially vertical relation to the end surface 20. However, for assuring the mounting area, there arise problems such as increase of the time and labor for manufacturing the electronic equipment or mounting substrate and increase of the cost due to the restrictions by the design, or there is a problem of hindrance to the miniaturization of electronic equipment. Also, even in vertical installation, the transmitting and receiving gains are insufficient in many cases.

Figure 8:
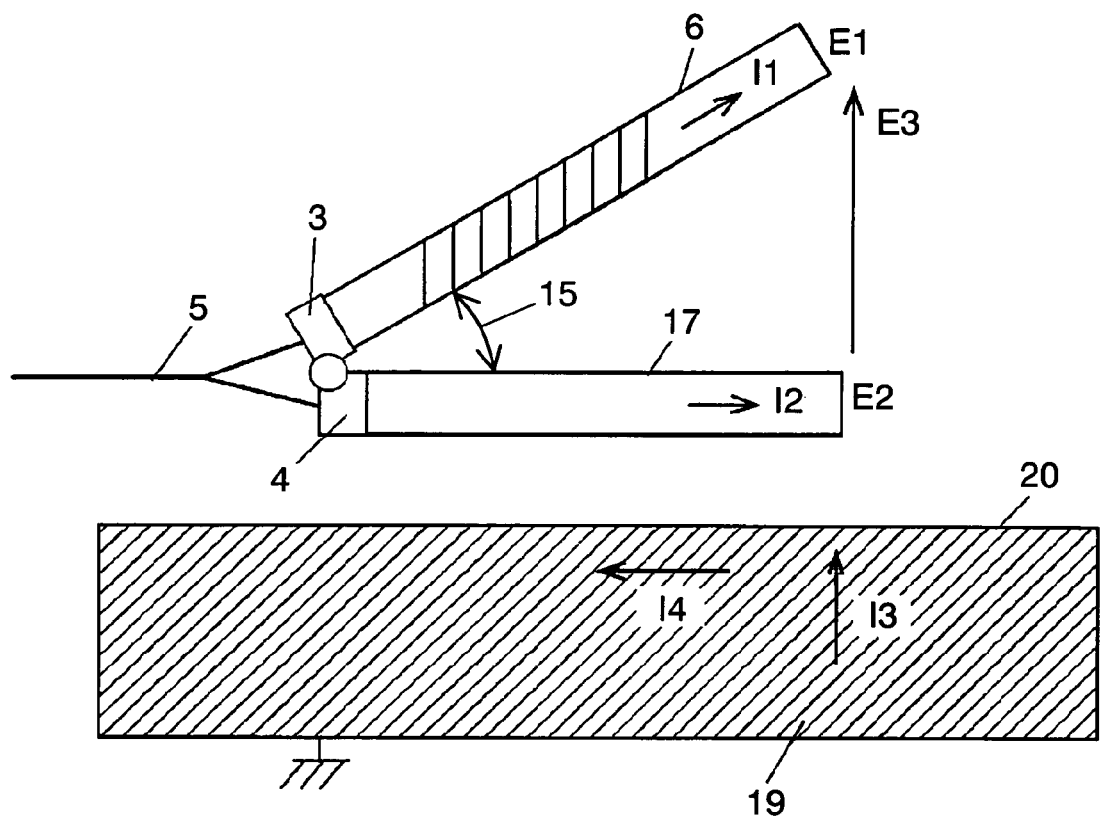
FIG. 8 is a schematic diagram of operation of an antenna element of the present invention.

On the other hand, in the case of the antenna element of the present invention shown in FIG. 8, signal current I1 flowing in antenna 1 (or helical antenna 6) is not lowered as compared with the image current.

The sub-conductor 17 (or antenna 2, or helical antenna 7) is installed substantially parallel to the end surface 20. Also, since the helical antenna 6 (or antenna 1) is disposed at optional angle 15, it is not substantially parallel to the end surface 20. Moreover, as compared with the case of installing the single antenna 16b substantially vertical to the end surface 20, it is naturally possible to make smaller the mounting zone in a direction the helical antenna 6 vertically recedes from the end surface 20. Accordingly, there is no hindrance to the miniaturization of electronic equipment.

The transmitting and receiving gains at the helical antenna 6 are determined by the current I1 flowing in the helical antenna 6. The image current I3 is produced by electric field E3 generated, and image current I4 is produced against the current I2 flowing in the sub-conductor 17.

Here, the electric field E3 generated is substantially vertical to the sub-conductor 17, that is, substantially vertical to the end surface 20 of metallic portion 19. The image current I3 is generated in a direction corresponding to the electric field E3 generated. That is, the image current I3 is generated substantially vertically to the end surface 20 of the metallic portion, and there is almost no hindrance to the current I1 flowing in the helical antenna 6 and the current I2 flowing in the sub-conductor 17.

In the above configuration, the transmitting and receiving gains at the helical antenna 6 (or antenna 1) due to the image current are not reduced, thereby realizing further enhancement of the gains.

That is, in the antenna element related to the present invention, it is possible to eliminate bad influences caused due to image current and to realize the improvement of the gains.

Further, since the signal current I2 is reduced by the image current I4, the current I1 flowing in the helical antenna 6 is generated as if it is alone, thereby obtaining sufficient gains of transmission and reception at the helical antenna 6.

Here, similar effects are obtained even with use of antenna 2 (or helical antenna 7) in place of the sub-conductor 17.

As described above, in the antenna element in the preferred embodiment 1 of the present invention, it is possible to avoid the increase in size of the antenna element and the increase in size of the electronic equipment mounted, and also to prevent the lowering of transmitting and receiving gains generated as a result of building the antenna element into the electronic equipment. In addition, the transmitting and receiving gains can be further improved. Particularly, in assuring the transmitting and receiving gains, the dependency on the internal state of the electronic equipment mounted can be very much reduced.

Next, the experimental result will be described with respect to the performance of such an antenna element.

Figure 9:
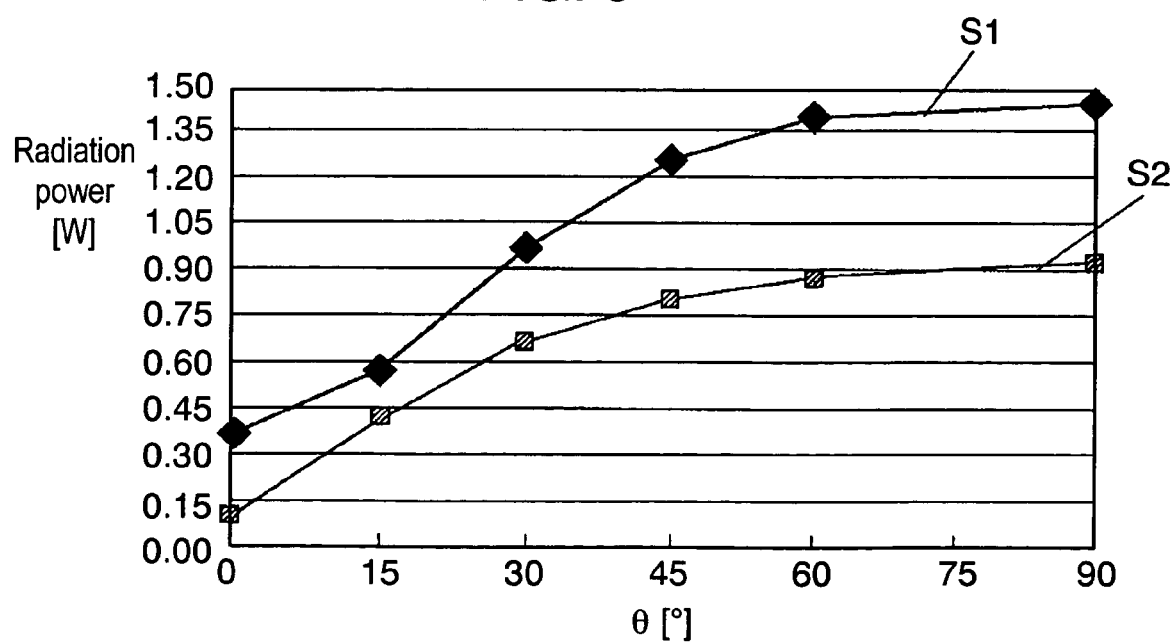
FIG. 9 is a diagram showing the experimental result in the preferred embodiment 1 of the present invention.
Figure 10:
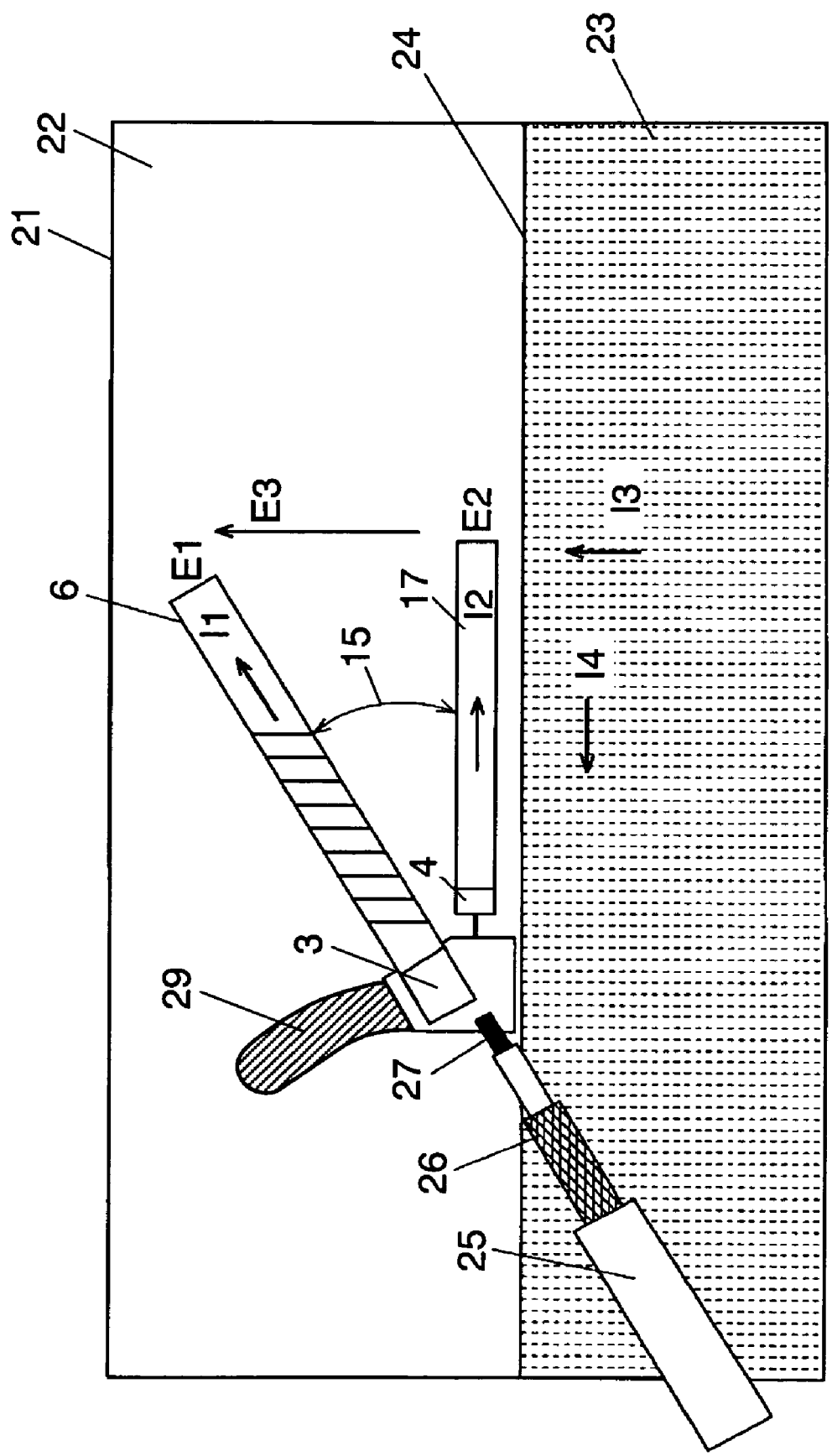
FIG. 10 is a configuration diagram of an antenna module in the preferred embodiment 2 of the present invention.

FIG. 9 is a diagram showing the experimental result in the preferred embodiment 1 of the present invention. The vertical axis stands for radiant power. The horizontal axis stands for optional angle 15 formed by the helical antenna 6 and the sub-conductor 17 in the case of the antenna element of the present invention, and for the angle between the end surface 20 of conductor 19 and the single antenna 16b in the case of a conventional antenna element.

Curve S1 is a curved line that shows the result in the case of the antenna element (antenna element of FIG. 8) related to the present invention, and curve S2 is a curved line that shows the result in the case of a conventional antenna (antenna element of FIG. 7).

As is obvious from FIG. 9, the curve S1 is higher in radiant power than the curve S2. That is, it is more excellent in transmitting and receiving gains. Accordingly, since the electric field E3 generated is substantially vertical to the end surface 20 of conductor 19, it is clear that hindrance due to the image current generated at the conductor 19 is eliminated, and also, the contribution to the increase of the gains is enhanced. In the antenna element of the present invention, the effects obtained are more excellent as compared with the conventional antenna element.

Particularly, even when the angle 15 is 90 degrees, that is, the antenna 1 and single antenna 16b are installed substantially vertically to the end surface 20 of conductor 19, the transmitting and receiving gains of the antenna element of the present invention are very high. This is because the image current generated due to the electric field E3 more intensely contributes to the improvement of the transmitting and receiving gains.

Also, from the viewpoint of the gain effects, manufacture and mounting operation, the optional angle 15 is desirable to be within an acute angle ranging from about 5 degrees to 90 degrees. Further, taking into account the convenience in mounting the antenna element onto electronic equipment, the angle is more preferable to be 10 degrees to 60 degrees. Similar effects can be obtained of course even when the angle is over 90 degrees and less than 180 degrees, but it is necessary to note that there are demerits such as an increase in volume occupied by the antenna element.

In an antenna element having the configuration as described above, even when the antenna element is disposed in the vicinity of a conductor such as a ground plane and is also in almost parallel fashion therewith, it is not affected by image current generated at the conductor, and the transmitting and receiving gains are improved. Further, it is not needed to obtain a mounting zone for keeping the single antenna vertical to the end surface of the conductor, making it possible to reduce the manufacturing cost of the electronic equipment and to achieve the purpose of miniaturization.

Preferred Embodiment 2

FIG. 10, FIG. 11, FIG. 12, FIG. 13, FIG. 14, FIG. 15 and FIG. 16 are the configuration diagrams of an antenna module in the preferred embodiment 2 of the present invention.

First, each component will be described in the following.

Antennas 1, 2, helical antennas 6, 7, sub-conductor 17, or additional conductor 18 are mounted on non-conductive zone 22 of mounting body 21.

Figure 11:
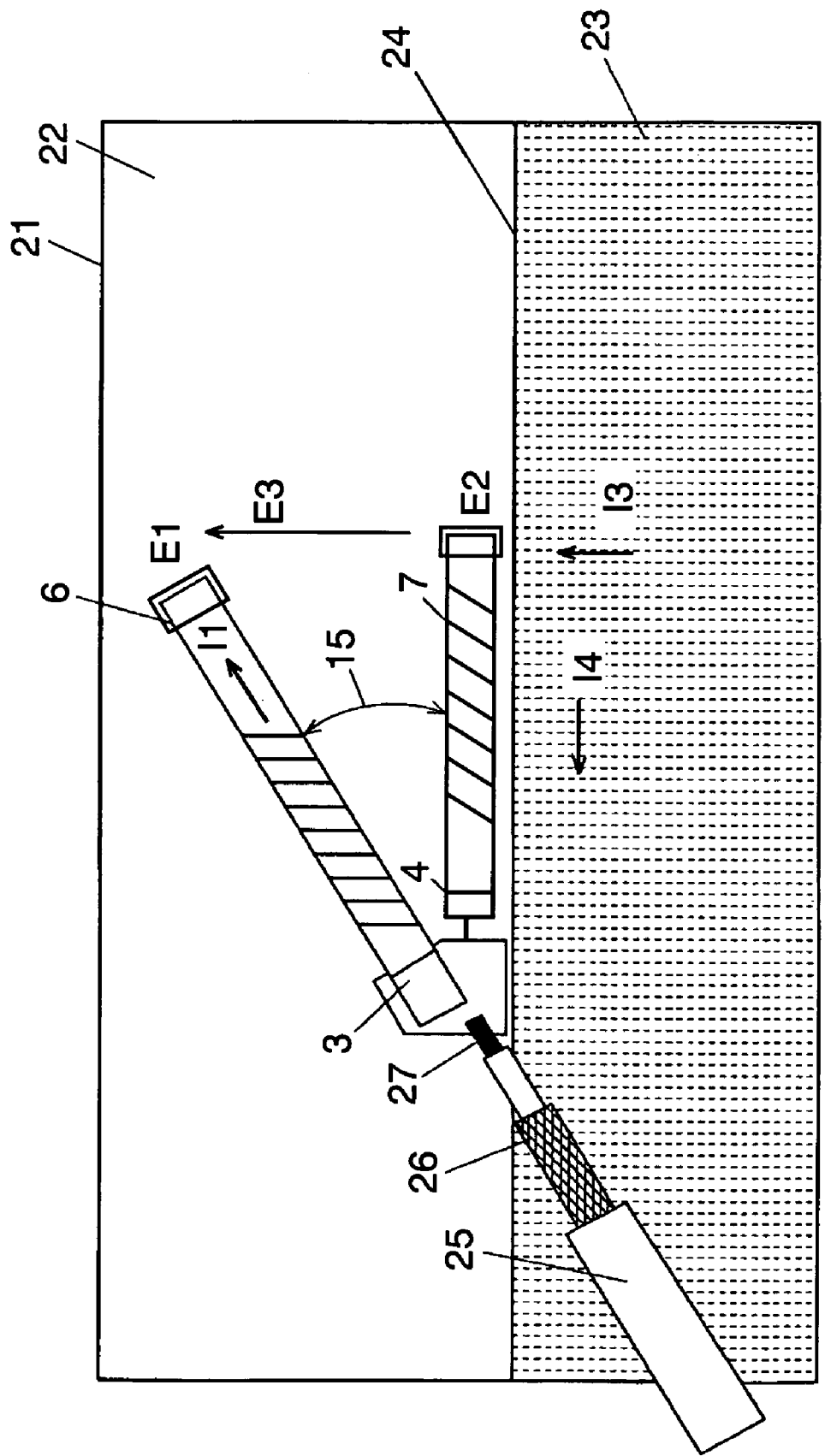
FIG. 11 is a configuration diagram of an antenna module in the preferred embodiment 2 of the present invention.
Figure 13:
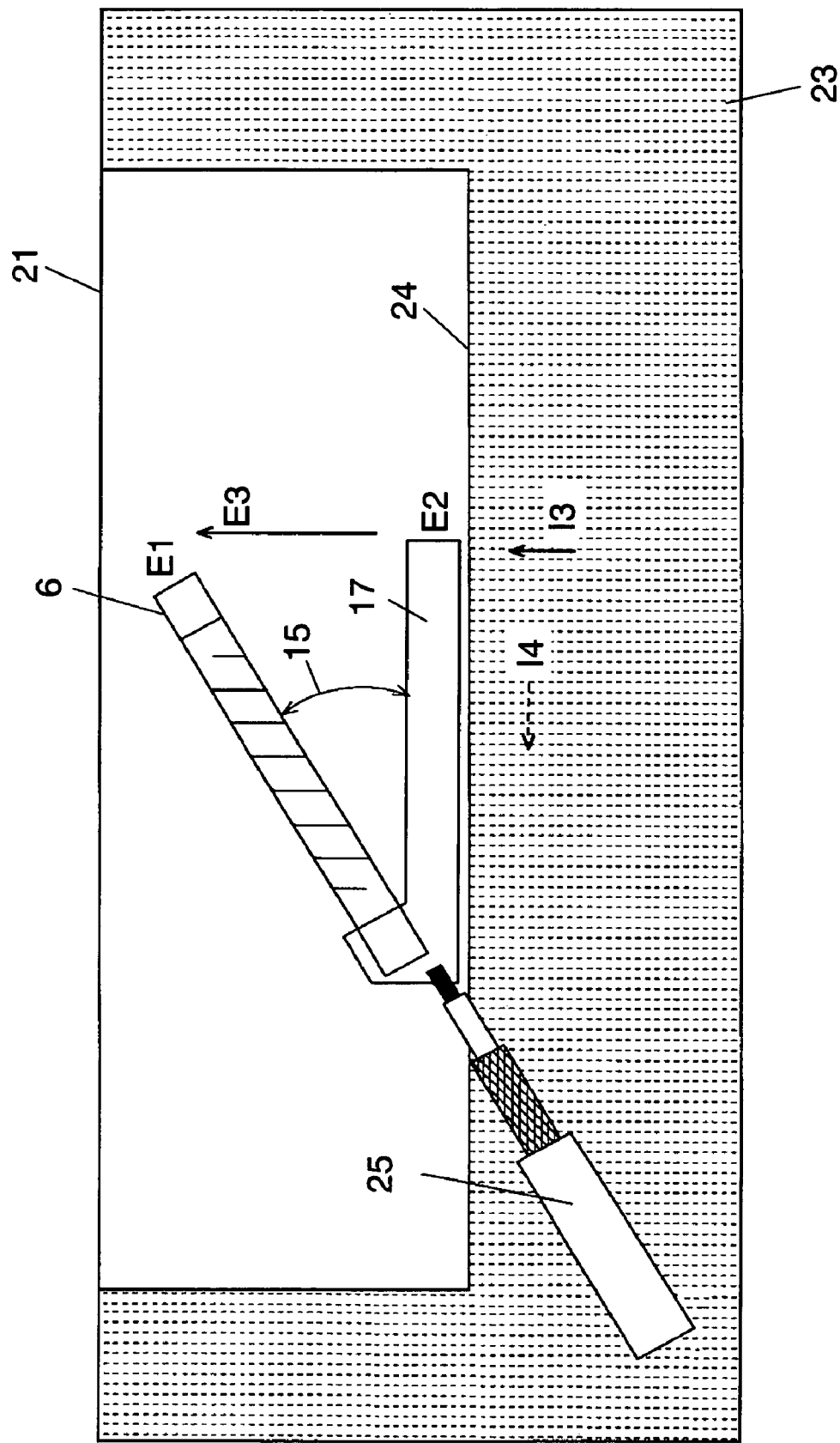
FIG. 13 is a configuration diagram of an antenna module in the preferred embodiment 2 of the present invention.

Conductor 23 is formed on a portion other than the mounting area of the helical antenna 6 in the mounting body 21. The conductor 23 is, for example, a substrate pattern, metal layer, or metallic plate. The conductor 23 is, as shown in FIG. 11, preferably formed only at the lower part of the helical antenna 6 or the like, or as shown in FIG. 13, preferably formed at both sides thereof. In this case, for one side 24 of the conductor 23, when the distance between it and the conductor formed at both sides is nearly integer multiples of the half-wavelength of the transmitting and receiving frequency, due to the resonance between the conductor 23 forming the recessed state and the helical antenna 6, the conductor 23 operates as if it is an antenna. As a result, it becomes possible to further improve the transmitting and receiving gains.

Coaxial cable 25 is an example of feeder line 5, but it is preferably other than coaxial cable 25, and also preferably a pattern lead wire or the like on a substrate. The coaxial cable 25 is provided with core wire 27 and external lead wire 26. The lead wire 26 is connected to GND or a portion corresponding to GND, and the core wire 27 serves as a feeder.

One or both of sub-conductor 17 and additional conductor 18 are preferably configured by a substrate pattern formed on the mounting body 21. Or, it is also preferred to be separately realized by an element or the like having a substrate. In the case of being configured by a substrate pattern, there are merits such that it can be easily formed.

Feeder portions 3, 4 and open portions 3b, 4b are preferable connected to the mounting body 21 by means of a mounting land formed on the mounting body 21, and in this case, it is preferable to realize the connection by means of solder or the like.

The mounting body 21 is preferably a part of the casing or substrate of electronic equipment in which the antenna module is housed. For example, it is preferably a part of main substrate of a portable telephone, a part of peripheral edge portion of the casing or a part of main substrate of a notebook personal computer.

The helical antenna 6 is preferably a conductor antenna or pattern antenna other than a helical antenna, and also preferably the one formed with a helical conductor configured in that a conductive layer formed on the substrate is trimmed by laser or the like to form trimming grooves. Or, such a helical conductor is preferably formed by winding a conductive wire around the substrate. In use of a helical antenna, there are merits such that the miniaturization of the antenna module is promoted.

Figure 12:
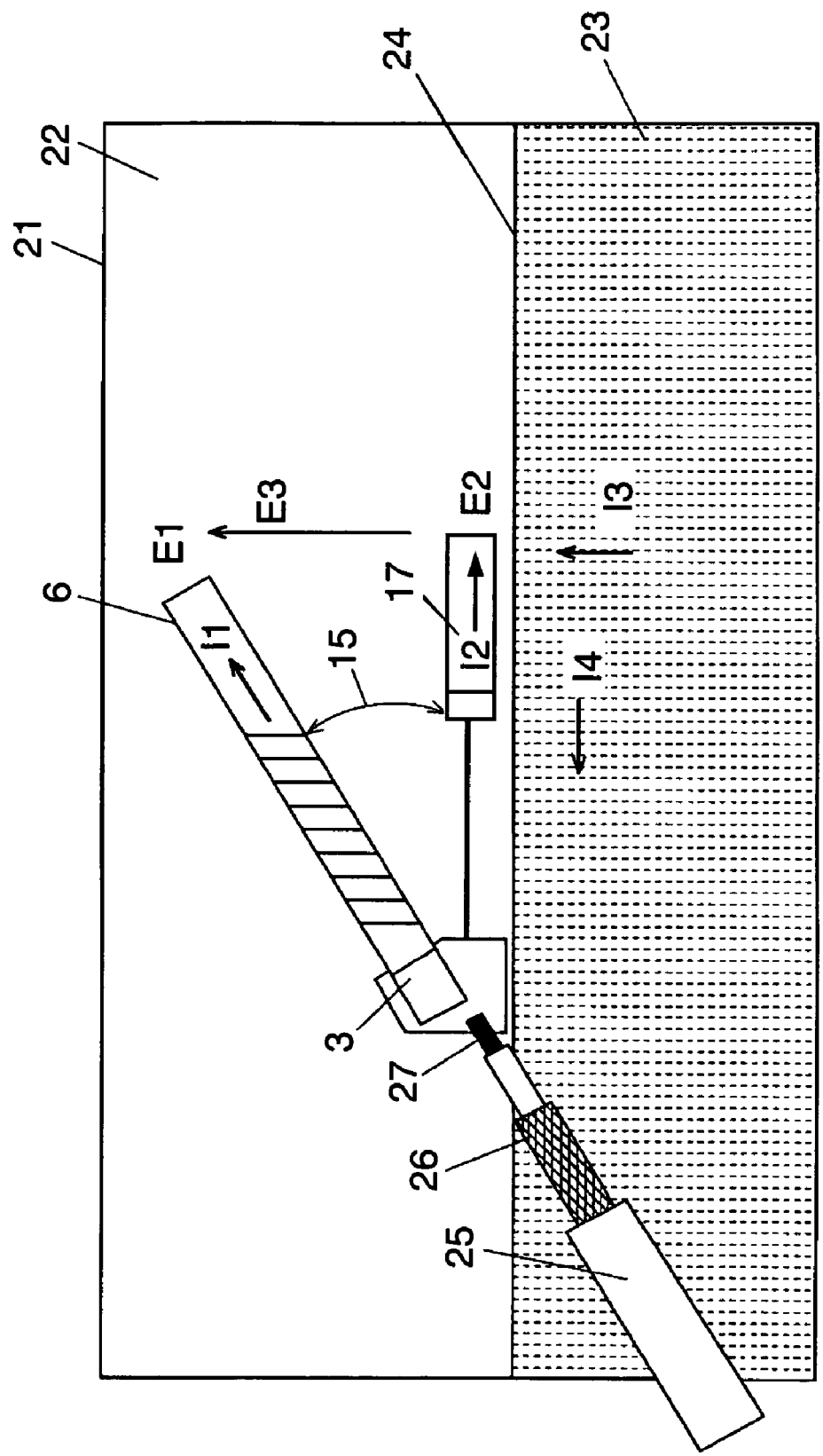
FIG. 12 is a configuration diagram of an antenna module in the preferred embodiment 2 of the present invention.

The sub-conductor 17 is, as shown in FIG. 11, preferably helical antenna 7, conductor antenna or pattern antenna. Also, the conductor length of the sub-conductor 17 is, as shown in FIG. 12, preferably shorter than that of the helical antenna 6. Also, the feeder portion 4 of sub-conductor 17 is, as shown in FIG. 13, preferably formed in common with the feeder portion 3 of helical antenna 6.

Also, the sub-conductor 17 and helical antenna 7 are preferably substantially parallel with one side 24 of the conductor 23 in the lengthwise direction. In this way, electric field E3 generated between it and helical antenna 6 is effectively generated and at the same time image current I4 is generated to cancel the current I2 flowing on the sub-conductor 17 (or helical antenna 7). Thus, it becomes as if there exists only the current I1 generated at the helical antenna 6 operating as an antenna in transmitting and receiving operation, which leads to the improvement of transmitting and receiving gains.

Incidentally, it is preferable to feed the current by same signal to the helical antenna 6 and the sub-conductor 17 or by feeding it individually. Also, it is preferable to connect the first antenna 6 to the sub-conductor 17 (or helical antenna 7) by means of the feeder portions 3, 4, or by providing a rotary portion, and also preferable to make no connection thereof.

Also, the angle 15 is preferably an acute angle ranging from 0 degree to 90 degrees from the viewpoint of mounting area and manufacturing convenience, but as is obvious from the experimental result in FIG. 9, it is more preferably 5 degrees to 60 degrees from the viewpoint of balance between gain performance and mounting area.

Further, it is preferable to form a protective layer on the helical antennas 6, 7 by using tube-like resin or coating paint so as to cover at least the helical conductor.

Also, in order to increase the number of resonance frequencies of the antenna module, it is possible to cope with the transmitting and receiving frequency determined depending upon the conductor length of conductor antenna 29 by forming the conductor antenna 29 at the feeder portion 3 of helical antenna 6.

Next, the operation of the antenna module will be described.

The current I1 is a current that flows in the helical antenna 6, and the current I2 is a current that flows in the sub-conductor 17 (or helical antenna 7). Due to the level difference between electric field E1 generated at the helical antenna 6 and electric field E2 generated at the sub-conductor 17, electric field E3 is generated at the conductor 23 in substantially vertical fashion thereto. As a result, image current I3 is generated in substantially vertical fashion to one side 24 of the conductor 23. The image current I3 does not hinder the current I1 flowing in the helical antenna 6 and there arises no problem of lowering the gains. Moreover, since the image current I3 functions to add a force to the current I1 flowing in the helical antenna 6, it contributes to the improvement of the transmitting and receiving gains at the helical antenna 6. Also generated is a force to reduce the current I2 that flows in the sub-conductor 17 due to the image current I4. Accordingly, it results in creating a state as if the current I1 flowing in the helical antenna 6 exists alone, and the transmitting and receiving gains are further improved.

All of these factors contribute to the improvement of transmitting and receiving gains. Particularly, since a module with the helical antenna 6 or the like mounted in the mounting body 21 together with the conductor 23 is built into electronic equipment, the deterioration of transmitting and receiving gains obtained by the module alone may be very much reduced after it is built into electronic equipment. Therefore, even after it is built into any types of electronic equipment, there are merits such that it is easy to maintain the transmitting and receiving gains of the antenna module before being built-in.

Figure 14:
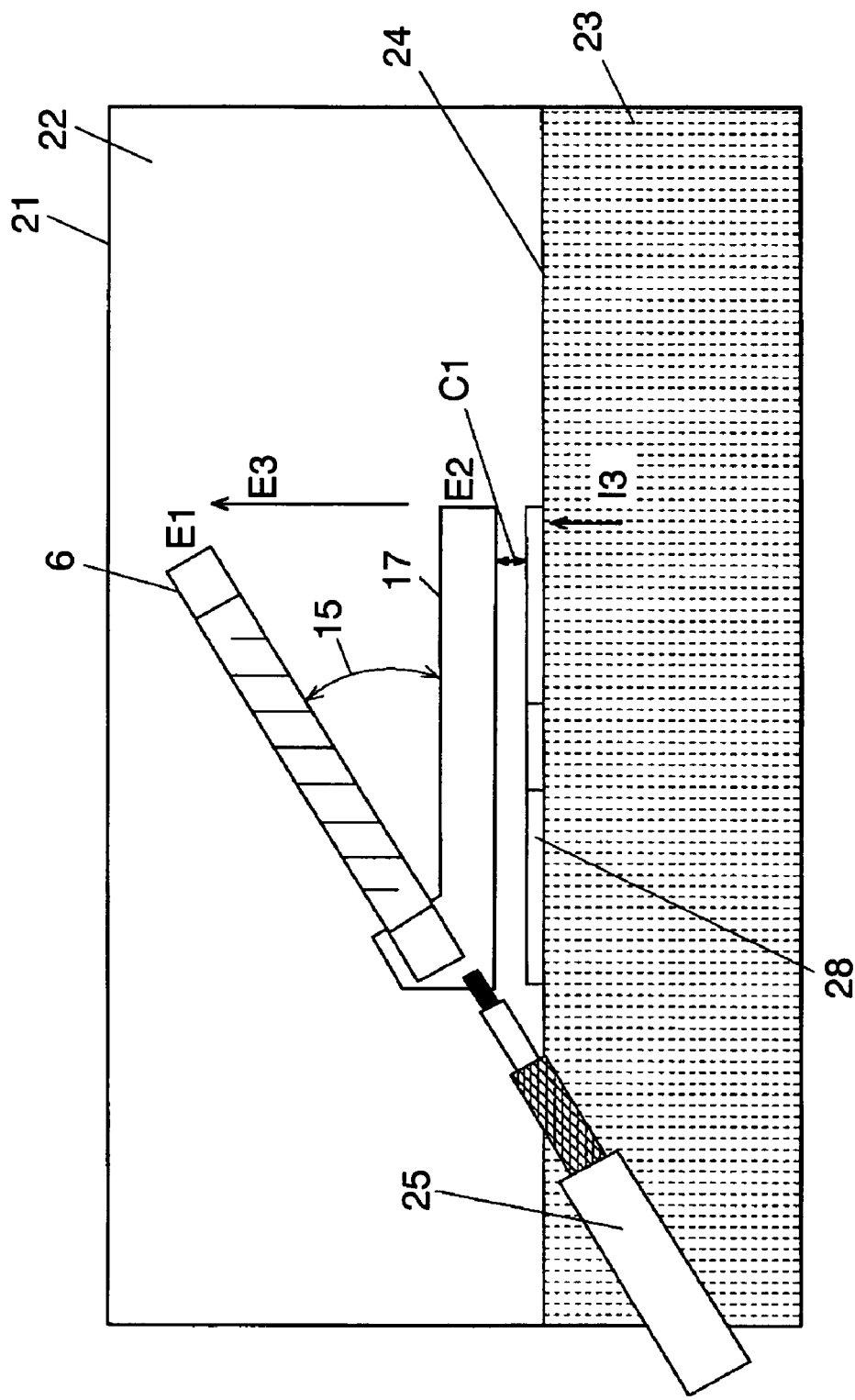
FIG. 14 is a configuration diagram of an antenna module in the preferred embodiment 2 of the present invention.
Figure 15:
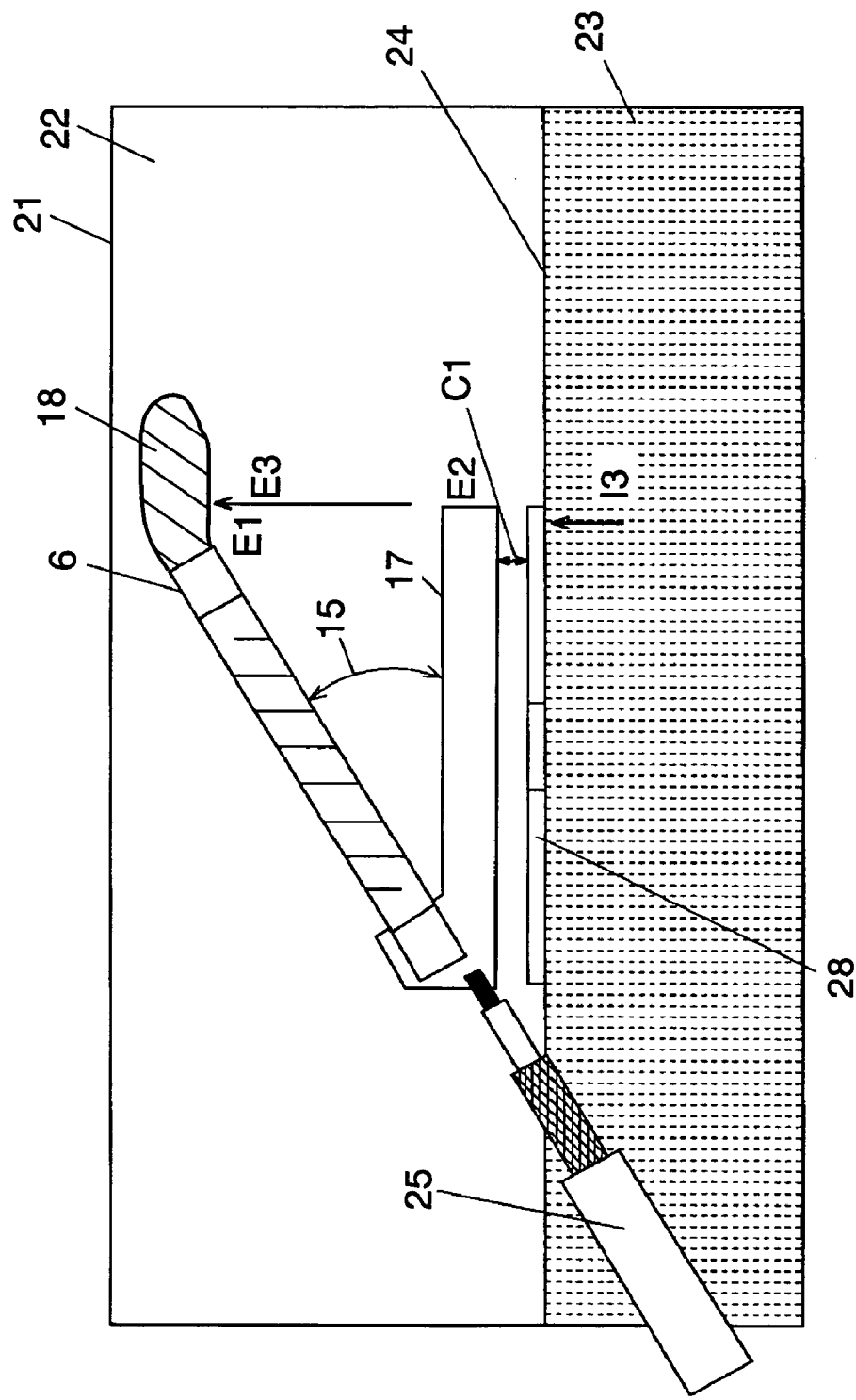
FIG. 15 is a configuration diagram of an antenna module in the preferred embodiment 2 of the present invention.
Figure 16:
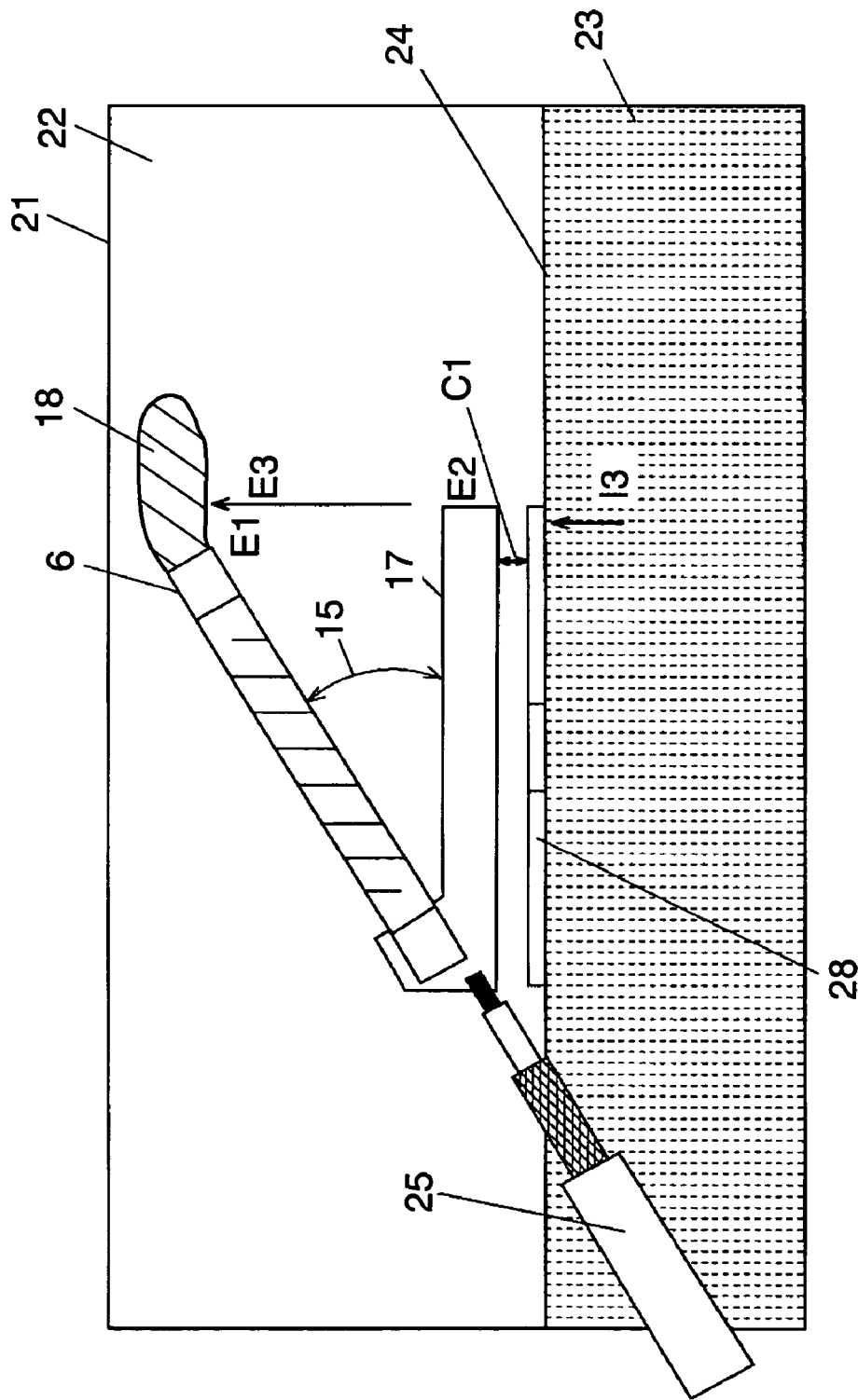
FIG. 16 is a configuration diagram of an antenna module in the preferred embodiment 2 of the present invention.

Next, by using FIG. 14, the easiness of assuring impedance matching at the antenna module will be described in the following.

With the sub-conductor 17 (or helical antenna 7) disposed in substantially parallel fashion with one side 24 of the conductor, capacity component C1 is generated due to the potential difference between them. The generation of capacity component C1 makes it possible to use the capacity component for the adjustment of impedance matching as the entire antenna module. In this case, to obtain the capacity component C1 suited for the adjustment of impedance matching, it is preferable to previously adjust the length opposing to the distance between the sub-conductor 17 (or helical antenna 7) and one side 24 of the conductor.

Further, it is preferable, by using spacer 28, to properly change the length opposing to the distance and to change the capacity component C1 in order to make easier the post-adjustment of impedance adjustment.

After thickening the spacer 28, it is possible to increase the capacity component C1 by decreasing the distance between the sub-conductor 17 and one side 24 of the conductor, and vice versa. Accordingly, it becomes possible to produce the capacity component needed for impedance matching without providing a capacitor or the like separately. With the purpose of impedance matching achieved, the reflected waves at the antenna are reduced and it is possible to prevent the lowering of gains in the transmitting and receiving operation.

Particularly, since there is no need of additionally mounting a capacitor element or the like for achieving the purpose of impedance matching, there are merits such that the cost reduction and miniaturization can be realized.

When such an antenna module is built into electronic equipment such as portable terminals, there is already provided conductor 23 and it is possible to avoid a problem of gain lowering. Accordingly, it becomes possible to avoid a conventional problem of gain lowering caused when the antenna element is built into electronic equipment and to assure the transmitting and receiving performance, and it is not necessary to take time for post-adjustment or the like. Further, since the sub-conductor 17 (or helical antenna 7) is disposed in substantially parallel fashion with one side 24 of the conductor, it is possible to make the adjustment of impedance matching by using the capacity component C1 generated between them, and also, to make easier the post-adjustment of impedance matching with use of the spacer 28.

Preferred Embodiment 3

FIG. 17, FIG. 18, FIG. 19, FIG. 20, and FIG. 21 are configuration diagrams of an antenna module in the preferred embodiment 3 of the present invention.

In FIG. 17 to FIG. 21, a conductor is formed in such manner as to cover the periphery of the antenna element. That is, the antenna is mounted in the opening 30 of conductor 23 having an opening or in a space formed vertically thereof.

In the opening 30 is mounted helical antenna 6 (or antenna 1) and sub-conductor 17 (or antenna 2 or helical antenna 7).

Each component will be described in detail in the following.

First, the opening 30 is described.

The opening 30 is not always necessary to be physically formed, but it is only required to be free of conductor 23. Also, in same mounting body 21, it is preferable to be the opening 30 being a non-conductive area where the helical antenna 6 or the like is mounted, while the conductor 23 is disposed so as to surround it. In this case, the interior surrounded by the conductor 23 is the opening 30 as a result.

Figure 17:
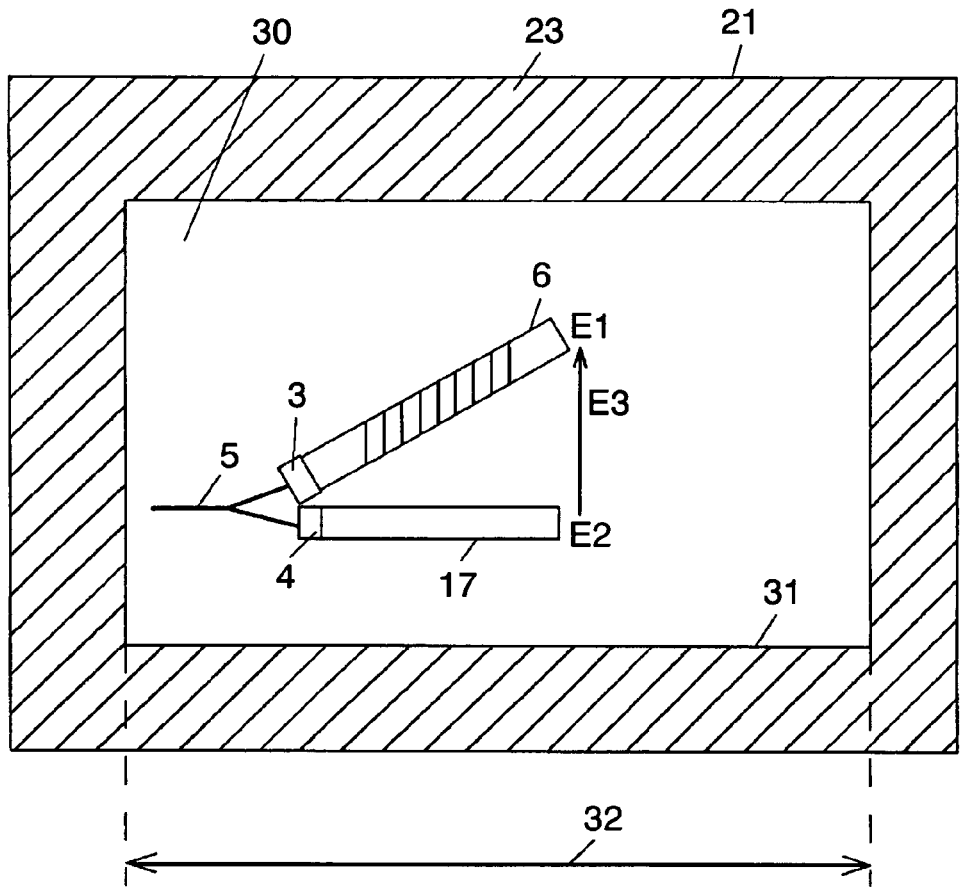
FIG. 17 is a configuration diagram of an antenna module in the preferred embodiment 3 of the present invention.

In FIG. 17 and others, the opening 30 is substantially square, but it is also preferable to be oval, circular, or square or polygonal in shape. Also, the one side length 32 of the opening is desirable to be nearly integer multiples of the half-wavelength of the transmitting and receiving waves, but more desirably, it is preferable to be half-wavelength or odd multiples of the half-wavelength. Further, in terms of actual dimensions, similar results can be obtained even in case of including some difference.

Next, the relationship between the opening 30 and the antenna element formed of helical antenna 6 or the like mounted therein will be described.

The helical antenna 6 or the like is mounted in the opening 30 which is an area where the conductor 23 does not exist and there exists a mounting board physically mounted.

Or, the helical antenna 6 or the like is not required to be formed in same mounting body 21 where the conductor 23 is formed, and the helical antenna 6 or the like is preferable to be secured and arranged on a stationary base in the opening 30 physically formed. Also, the helical antenna 6 or the like is preferable to be arranged in the opening 30 in a two-dimensional fashion or in a vertical space of the opening 30 in a three-dimensional fashion.

Due to the antenna module with an antenna element disposed in the opening 30, an effective slot antenna is configured in that the helical antenna 6 functions as a primary radiator and the opening 30 functions as a secondary radiator. That is, the opening 30 serves as an entrance and exit of electric waves transmitted and received, and emits the electric waves from the helical antenna 6 into the external space during the transmitting operation, and serves to transmit the electric waves from the external space to the helical antenna 6 during the receiving operation.

In this case, it is not always required to be the helical antenna 6, but preferable to be the antenna 1 formed of a conductor antenna or pattern antenna, and also preferable to be another antenna 2 instead of the sub-conductor 17. Also, in the helical antenna 6, as described in the preferred embodiments 1 and 2, electric field E3 is generated due to the difference between electric fields E1 and E2, and image current being substantially vertical to one side 31 of the opening is generated at the conductor 23, thereby improving the transmitting and receiving gains. Besides the improvement of the transmitting and receiving gains, the opening 30 serves as a secondary radiator, making it possible to realize an antenna module which assures excellent directionality and high gains.

Incidentally, the tip of the helical antenna 6 is desirably positioned nearly in the middle of one side 31 of the opening. It is because the size of electric field E3 is maximized at the tip of the first antenna 6 and also because the condition of resonance between the opening 30 and the helical antenna 6 to be described later becomes optimized.

Also, the antenna element formed of helical antenna 6 or the like must be installed without coming in contact with each side of the opening 30, but the distance must be about 10 mm or less, preferably 5 mm or less. The reason for this is that if the distance between the opening 30 and the helical antenna 6 is excessive, it will increase the loss of electric waves transmitted between the helical antenna 6 and the opening 30.

Also, the sub-conductor 17 (or antenna 2, or helical antenna 7) is preferred to be substantially parallel to one side 31 of the opening in its lengthwise direction, and in this case, the improvement of transmitting and receiving gains is maximized.

The operation of the antenna module will be described in the following.

Figure 18:
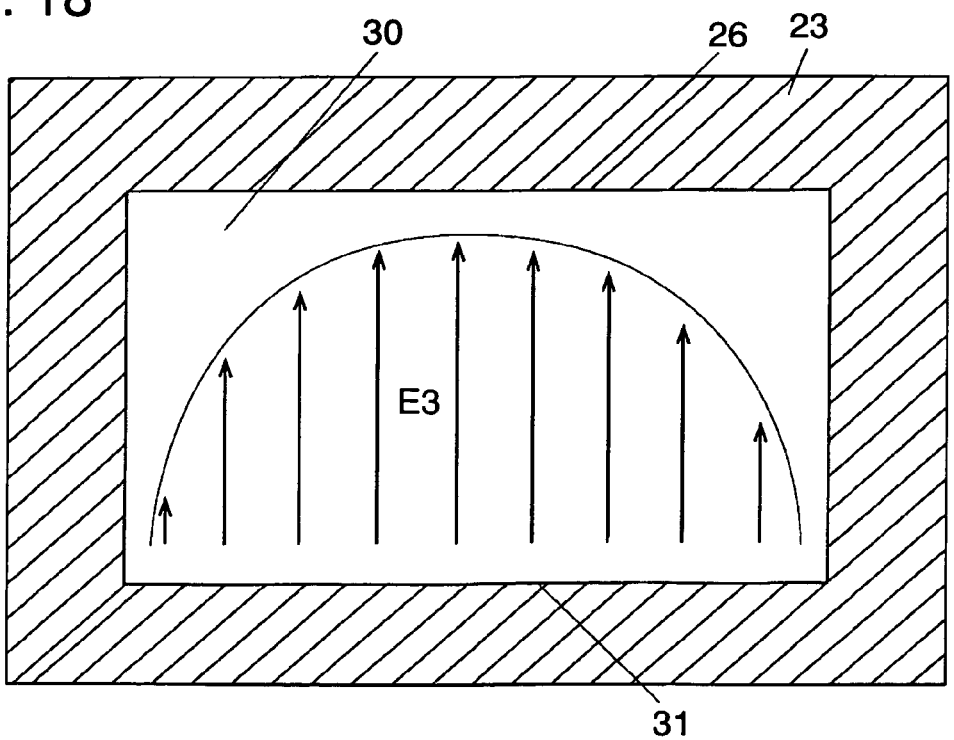
FIG. 18 is a configuration diagram of an antenna module in the preferred embodiment 3 of the present invention.

In FIG. 18, the distribution of electric fields generated in the opening 30 is shown.

Although it is not shown in FIG. 18, when current flows in the helical antenna 6 and the sub-conductor 17, electric field E3 is generated in a direction substantially vertical to one side 31 due to the difference in level of respective electric fields as shown in the preferred embodiments 1 and 2. In this case, the length of one side 31 of the opening is nearly integer multiples of the half-wavelength of transmitting and receiving waves. Accordingly, as shown in FIG. 18, the electric field is maximized nearly at the center of opening 30, and the electric field is minimized at both ends of the opening 30.

Due to the generation of the electric field E3, resonance is generated in the opening 30. That is, electric waves radiated from the helical antenna 6 are transmitted to the opening 30 through the resonance. The resonance frequency generated under the condition is identical with the frequency of signals applied to the helical antenna 6, and consequently, the signal applied to the helical antenna 6 is radiated and propagated from the opening 30 into the external space.

Since the helical antenna 6 is not in contact with the conductor 23, the loss of electric waves transmitted to the opening 30 through resonance is very slight. Further, the area of opening 30 is larger than the area of helical antenna 6, and therefore, the energy of electric waves radiated from the opening 30 is increased, resulting in the improvement of transmitting gains. In the case of receiving mode, the operation is reverse to that in transmitting mode, similarly improving the receiving gains.

That is, the electric field E3 is effectively generated at the opening 30 by means of an antenna as described in the preferred embodiment 1, and in this way, resonance at same frequency as the resonance frequency applied to the helical antenna 6 can be generated at the opening 30. Since one side 31 of the opening 30 is integer multiples of the half-wavelength of transmitting and receiving frequency signal, the electric field distribution in the opening 30 of the electric field E3 generated due to the level difference between the electric field E1 of sub-conductor 17 and the electric field E2 of helical antenna 6 is, as shown in FIG. 18, maximized nearly at the center and minimized at the ends. Namely, the half-wavelength signal distribution of transmitting and receiving frequencies is formed, and resonance at same frequency as the resonance frequency applied to the helical antenna 6 is produced at the opening 30.

As a result, a slot antenna is configured in that the helical antenna 6 serves as a primary radiator, and the opening 30 serves as a secondary radiator. Such an antenna is excellent in transmitting and receiving gains, further having directionality in vertical direction from the opening 30, and thereby, the transmitting and receiving efficiency is improved and the adjustment of the antenna direction in signal transmission and reception is simplified.

Also, in the conductor 23, as described in the preferred embodiments 1 and 2, image current I3, I4 is generated. Accordingly, a force that hinders the current I1 flowing in the helical antenna 6 is gone, similarly realizing the improvement of gains.

Further, since the sub-conductor 17 and one side 31 of the opening are in substantially parallel relation with each other, a capacity component is generated between them, and by using the capacity component, it is possible to make impedance matching without using any additional capacitor element or the like. Therefore, the size reduction and the cost lowering of the module can be realized. In this case, it is also preferable to dispose an adjustable spacer therebetween.

Figure 19:
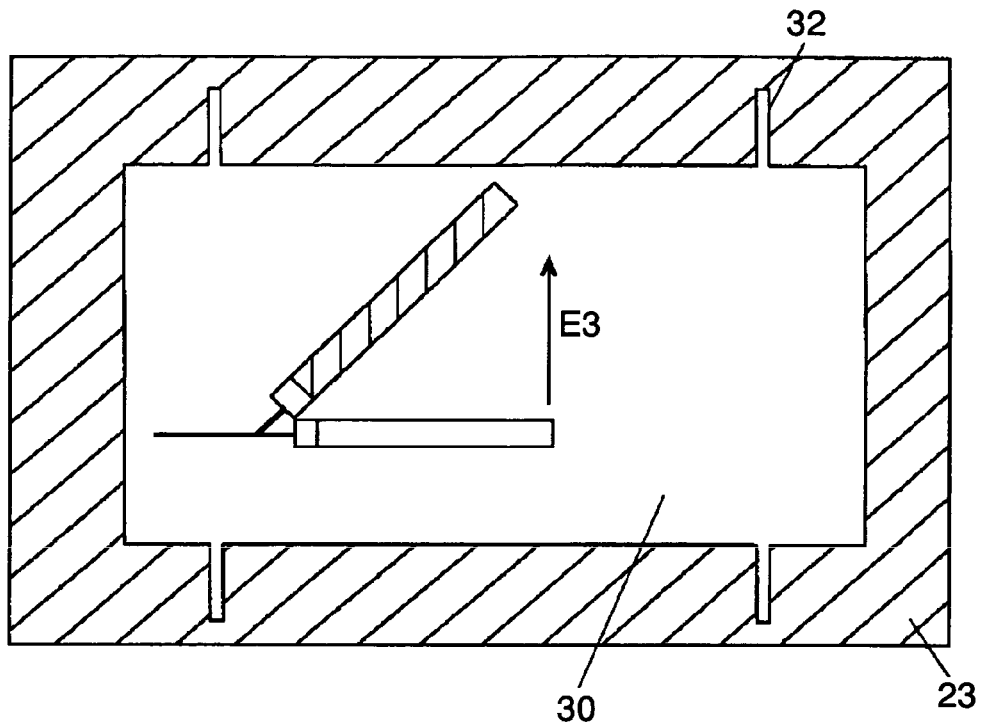
FIG. 19 is a configuration diagram of an antenna module in the preferred embodiment 3 of the present invention.
Figure 20:
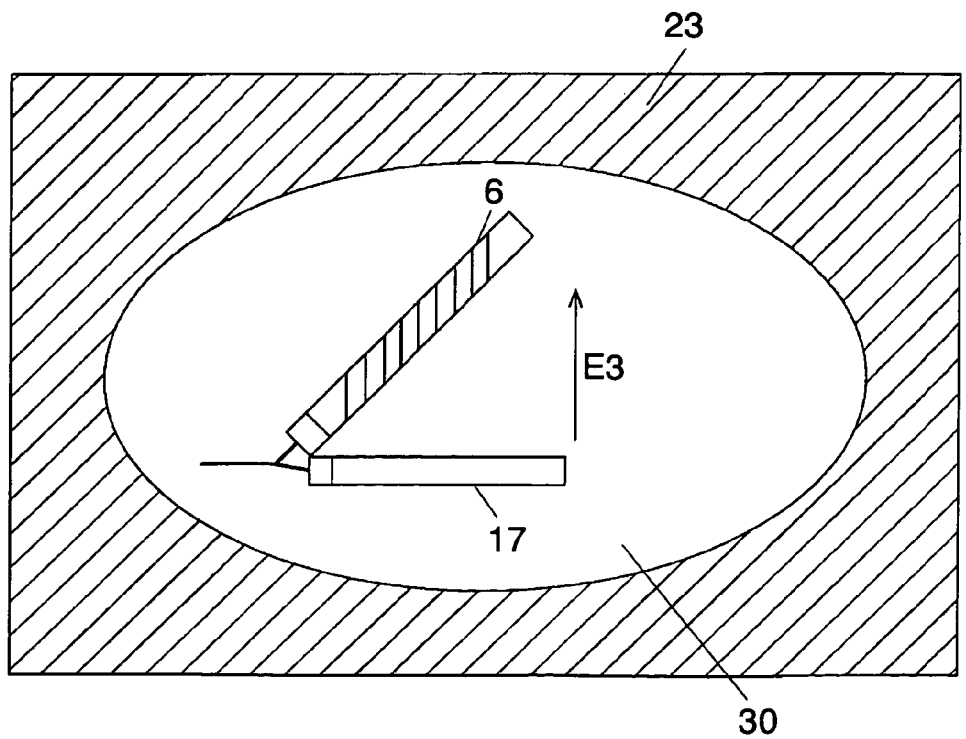
FIG. 20 is a configuration diagram of an antenna module in the preferred embodiment 3 of the present invention.
Figure 21:
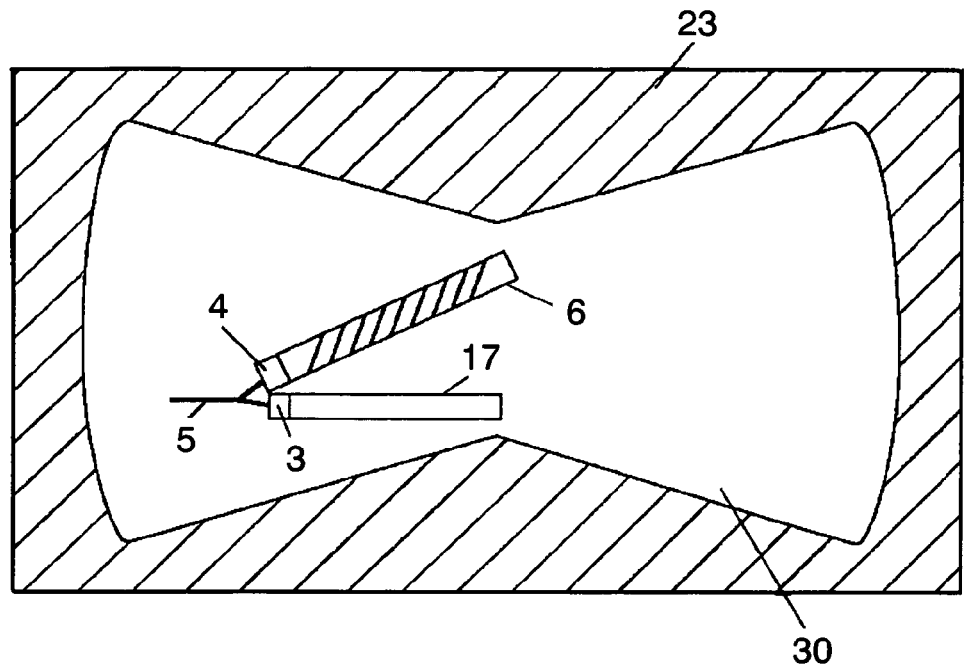
FIG. 21 is a configuration diagram of an antenna module in the preferred embodiment 3 of the present invention.

Also, FIG. 19 shows that slit 32 exists at a part of the opening 30, and FIG. 20 shows that the opening 30 is oval in shape, and FIG. 21 shows that the opening 30 is formed of a taper portion and an arc portion. Even in such cases as in FIG. 19 to FIG. 21, same effects as described above can be obtained, and the configuration can be properly decided in accordance with the types and specifications of the electronic equipment in which the antenna module is housed. Incidentally, with the opening 30 shaped as described above, it can be easily formed and brings about merits such that the durability is improved because of having no edges.

Next, the experimental result of such an antenna module will be described in the following.

(Table 1) shows the experimental result of an antenna module in the preferred embodiment 3 of the present invention. (Table 1) shows the comparison of gains between the antenna element described in the preferred embodiment 1 and the antenna module described in the preferred embodiment 3. Mentioned here is radiation power when the angle 15 between the helical antenna 6 and the sub-conductor 17 is 15 degrees.

TABLE 1

|  | Radiation power |
| --- | --- |
| Single antenna | 0.43 W |
| Antenna element in the preferred embodiment 1 | 0.58 W |
| Antenna module in the preferred embodiment 3 | 0.71 W |

As is apparent from (Table 1), the power is 0.56 W in the case of antenna element, while it is 0.71 W in the case of antenna module provided with conductor 23 having opening 30, showing that the gains are enhanced.

Also, same as in the preferred embodiment 2, since the antenna module is previously mounted in a mounting body, mounting it onto electronic equipment is simplified, and it is hardly affected by a conductor or the like at the periphery of the antenna module after mounting and it becomes possible to reduce the time and labor required for post-adjustment or the like.

Due to an antenna module having such a configuration, it is possible to avoid lowering of the performance in mounting an antenna in electronic equipment, to assure sufficient gain performance, to further enhance the transmitting and receiving gains, and to assure the directionality.

Preferred Embodiment 4

FIG. 22, FIG. 23, FIG. 24, FIG. 25, and FIG. 26 are the configuration diagrams of an antenna module in the preferred embodiment 4 of the present invention. FIG. 27 is the configuration diagram of an antenna module in a conventional embodiment.

In the preferred embodiment 4, using a single helical antenna without any sub-conductor or other antenna, the antenna realizes high gains and high directionality in combination with a conductor having an opening, which is described in the following.

First, each component is described.

Opening 45 is preferably physically formed, and it is also preferably surrounded by conductor 41 at mounting body 47 such as a substrate, and a helical antenna is preferably mounted, leaving a part of the mounting body 47 formed from resin or the like at the opening 45.

Or, as to the opening 45, in the mounting body that is a sheet of substrate, it is preferable that conductor 41 is formed other than opening 45, and that helical antenna 42 is mounted on a non-conductive board at the opening 45 where conductor 41 is not formed. A mounting land for mounting feeder portion 44 is formed.

Or, as the opening 45 physically formed, it is preferable to mount the helical antenna 42 by using a stationary base so that it is arranged in the zone of opening 45 or in the zone of its vertical space.

Next, the opening 45 will be described in the following.

Figure 22:
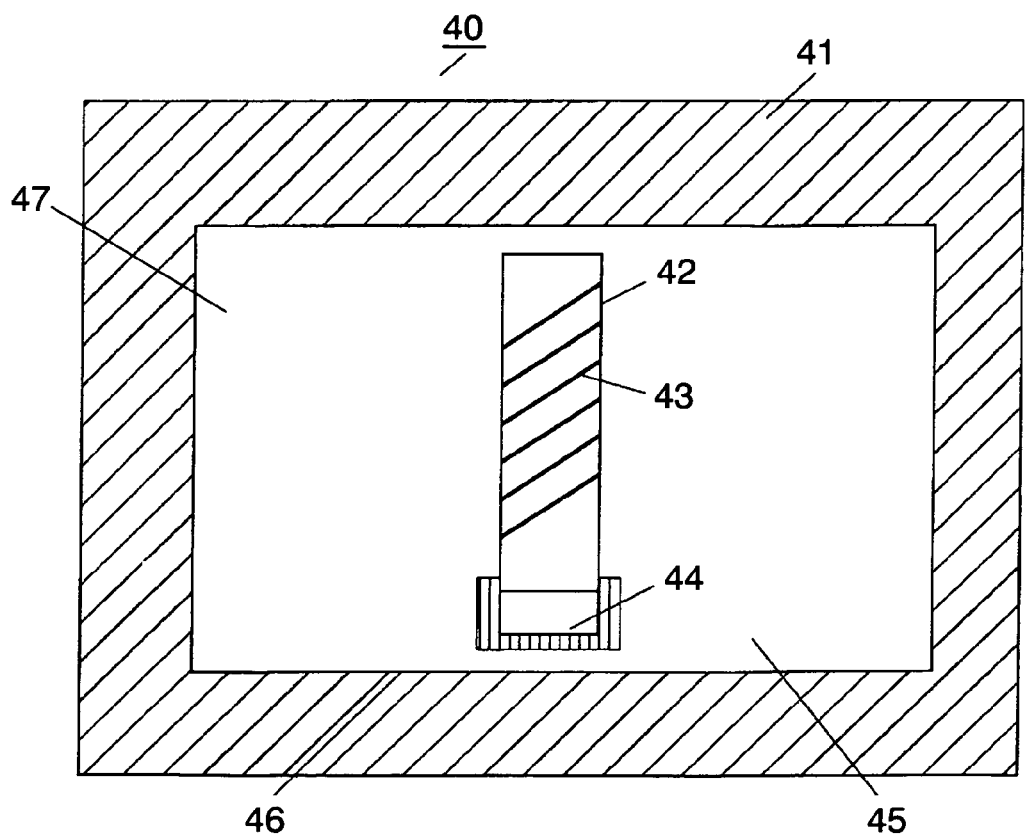
FIG. 22 is a configuration diagram of an antenna module in the preferred embodiment 4 of the present invention.
Figure 23:
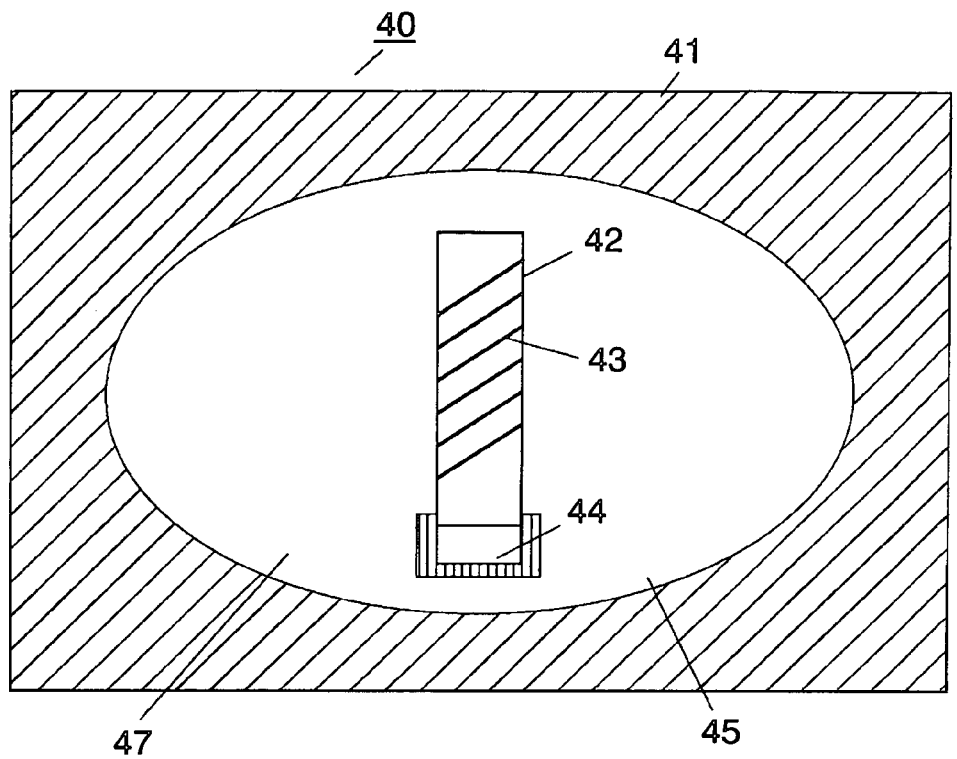
FIG. 23 is a configuration diagram of an antenna module in the preferred embodiment 4 of the present invention.
Figure 24:
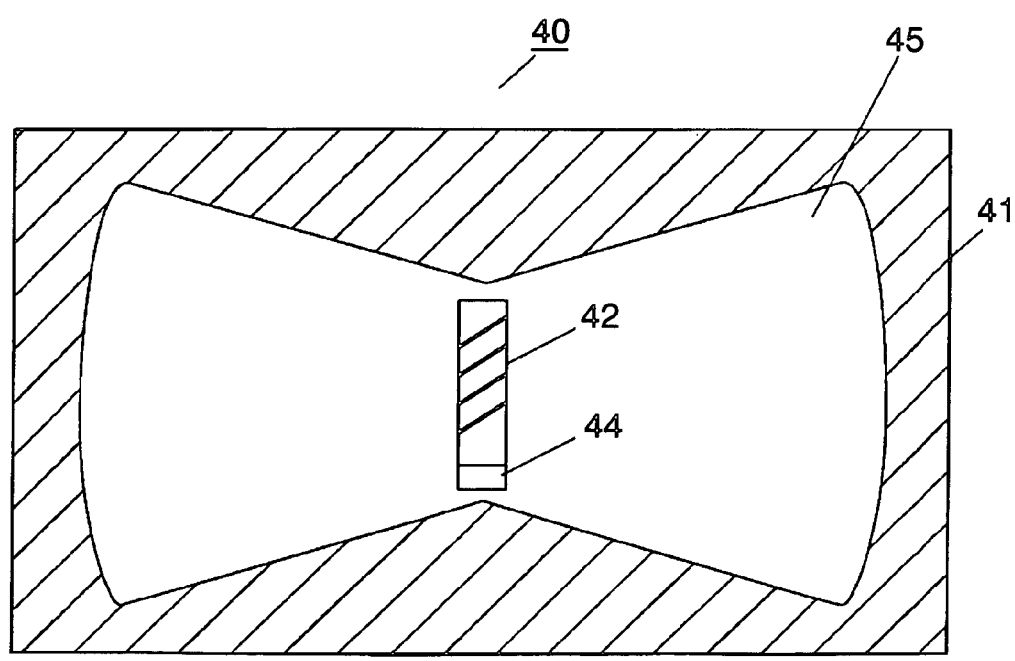
FIG. 24 is a configuration diagram of an antenna module in the preferred embodiment 4 of the present invention.
Figure 25:
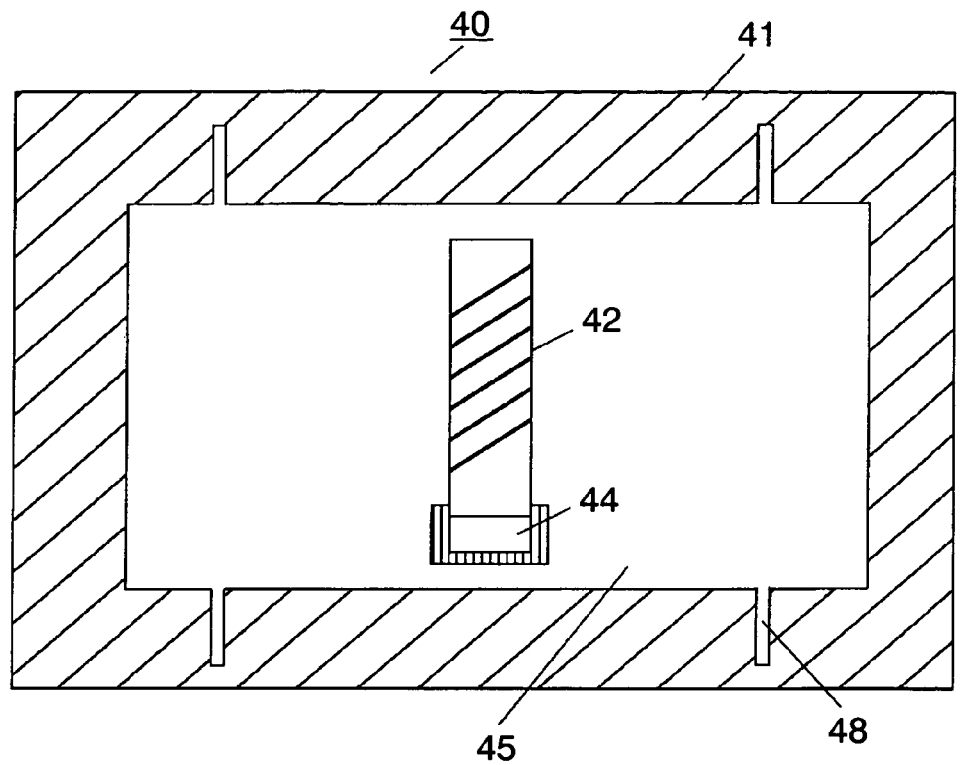
FIG. 25 is a configuration diagram of an antenna module in the preferred embodiment 4 of the present invention.

The shape of opening 45 is square in FIG. 22, but it is also preferable to be parallelogram, rhombus, or oval. Or, it is preferable to be polygonal partially having taper and curved portions.

The opening 45 being oval in shape, there are merits such that the strength and durability of the conductor 41 are improved. The opening 45 being polygonal in shape partially including taper and curved portions, there are merits such that the strength and durability are similarly improved. Similar effects can be obtained when the opening 45 is partially provided with slit 48.

The length of one side 46 of the opening discussed later is desired to be integer multiples of the half-wavelength of electric waves transmitted and received, and preferably to be the half-wavelength or odd multiples of it. However, it is allowable to include slight difference in actual dimensions. Also, the edge of opening 45 is preferable to be chamfered. Chamfering will bring about effects of improving the strength and durability. The conductor 41 is formed from a proper conductor such as metal, and is grounded to GND (ground surface) as needed.

The helical antenna 42 will be described in the following.

The helical antenna 42 is configured in that helical conductor 43 is formed on a substrate. The helical conductor 43 is preferable to be formed by forming trimming grooves in a substrate with a conductive layer formed thereon by means of laser or preferable to be formed by winding a conductive wire. The helical conductor as described in the preferred embodiment 1 includes a conductor component. Accordingly, as described in the preferred embodiment 1, the transmitting and receiving operation is performed at the resonance frequency in accordance with inductor component L generated from helical conductor 43 and resonance condition "$1/\sqrt{LC}$" that depends upon capacity component C produced from the other portions of the substrate.

Consequently, as compared with an ordinary conductor antenna or rod antenna using micro-strip lines, the size can be very much reduced in the case of same transmitting and receiving frequency. Since the helical antenna 42 is installed in the opening 45, it is possible to reduce the size of the opening 45, and as a result, there are merits such that the antenna module 40 itself can be reduced in size.

Incidentally, signal current is fed from feeder portion 44. The feeder portion 44 is preferable to be connected to RF circuit (high frequency circuit) which emits signals from a wiring pattern on an electronic board or preferable to be connected by using a physical signal line such as a coaxial cable.

Next, the relationship between helical antenna 42 and opening 45 will be described.

The helical antenna 42 is installed either in the opening 45 or in a position within the zone vertically formed by the opening 45. A support column not shown in FIG. 1 is used for the installation. Also, the helical antenna 42 is installed in substantially vertical fashion to one side 46 of the opening.

When it is installed in substantially parallel fashion thereto, as described in the preferred embodiment 1, the current that flows in the helical antenna 42 due to image current generated at the conductor 41 is hindered, causing the gains to be lowered.

On the other hand, when it is installed in substantially vertical fashion thereto, the image current generated at the conductor 41 flows in substantially vertical direction, that is, in the direction of current flowing in the helical antenna 42, and therefore, it is possible to enhance the transmitting and receiving gains, contributing to the current increase of the helical antenna 42.

Here, the helical antenna 42 is preferably to be installed in the opening 45 and also preferably installed three-dimensionally above or under the opening 45. However, if the distance between the opening 45 and the helical antenna 42 is increased to much, it will cause energy losses in resonance between the helical antenna 42 and the opening 45 to be increased, and it is necessary to limit the distance.

Also, the helical antenna 42 is preferably entirely installed either in the opening 45 or in a zone vertically formed by the opening 45, but a part of the helical antenna 42 is preferably outside the area of the opening 45. For example, when the helical antenna 42 is installed a few millimeters above the surface of opening 45, it is preferably installed in such manner that the helical antenna 42 exists within the surface of opening 45 as viewed from above the surface of opening 45 and also preferably installed in such manner that one end or both ends of the helical antenna 42 are outside the surface of opening 45, partially reaching the conductor 41. When a part of the helical antenna 42 overlaps the conductor 41 in non-contact fashion beyond the zone of the opening 45, a capacity component is generated between the helical antenna 42 and the conductor 41, and it is possible to use the capacity component for making the adjustment of impedance matching.

However, the helical antenna 42 is preferably installed without coming in contact with one side 46 of the opening 45. The distance is preferably 10 mm or less, and more preferably, about 10 mm or less. This is because if the distance between the opening 45 and the helical antenna 42 is excessive, the losses in electric wave transmission from the helical antenna 42 to the opening 45 will be increased.

Also, the helical antenna 42 is preferably installed near the center in the direction of one side 46 of the opening. The reason for this is that the electric field is maximized in the vicinity of the helical antenna 42, and in this case, the resonance discussed later is generated under the best condition. Also, the performance can be further improved by installing the helical antenna 42 at a position being an offset away in a direction from near the center, taking impedance matching into consideration. For example, when impedance matching is made by 50 ohms, the helical antenna 42 is installed in a position a certain amount away in a direction from near the center. When the opening 45 is resonated in half-wavelength, the impedance is minimized at a position near the center of the long side, and the impedance is maximized at the end of the long side. Thus, in such an offset fashion, it is possible to realize the adjustment between 50 ohms and impedance matching. Also, when the helical antenna 42 is installed at the center, it is possible to make matching by using a matching element.

Next, the operation of antenna module 40 will be described.

As shown in FIG. 22, in antenna module 40 having the helical antenna 42 installed in the opening 45, as described in the preferred embodiment 3, the helical antenna 42 functions as a primary radiator, and the opening 45 functions as a secondary radiator, and thereby, the antenna module 40 is effectively configured. That is, the opening 45 serves as an entrance and exit for transmitting and receiving electric waves, emitting the electric waves into the outside space from the helical antenna 42 in transmitting mode and transmitting the electric waves to the helical antenna 42 from the outside space in receiving mode.

Figure 26:
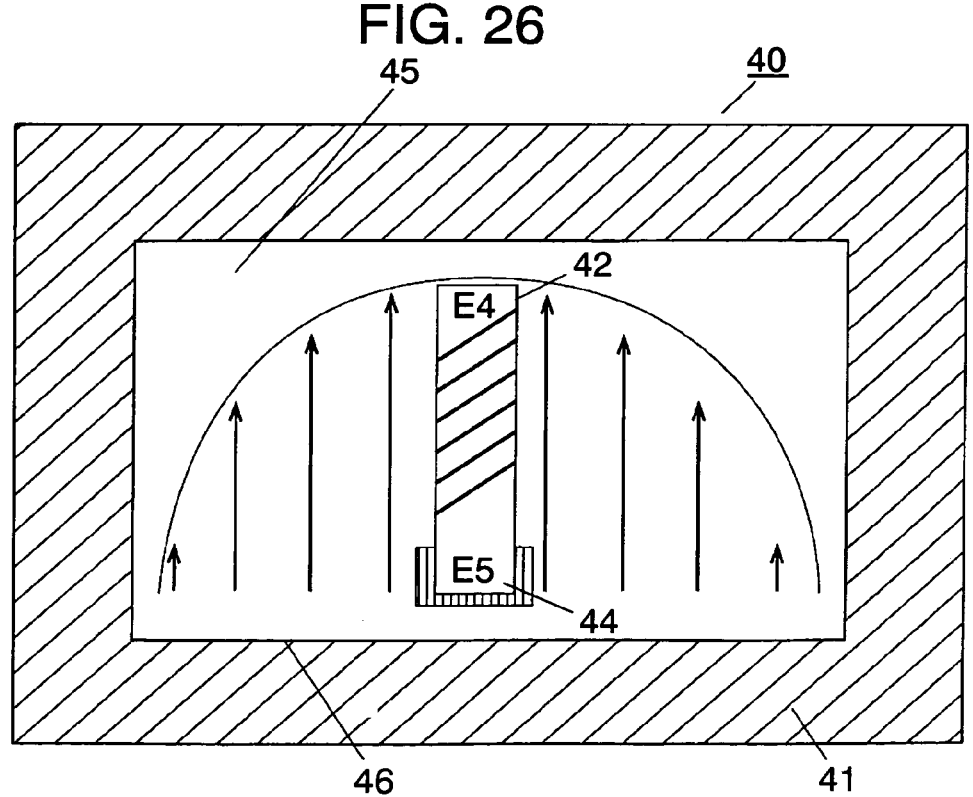
FIG. 26 is a configuration diagram of an antenna module in the preferred embodiment 4 of the present invention.
Figures 27, 28:
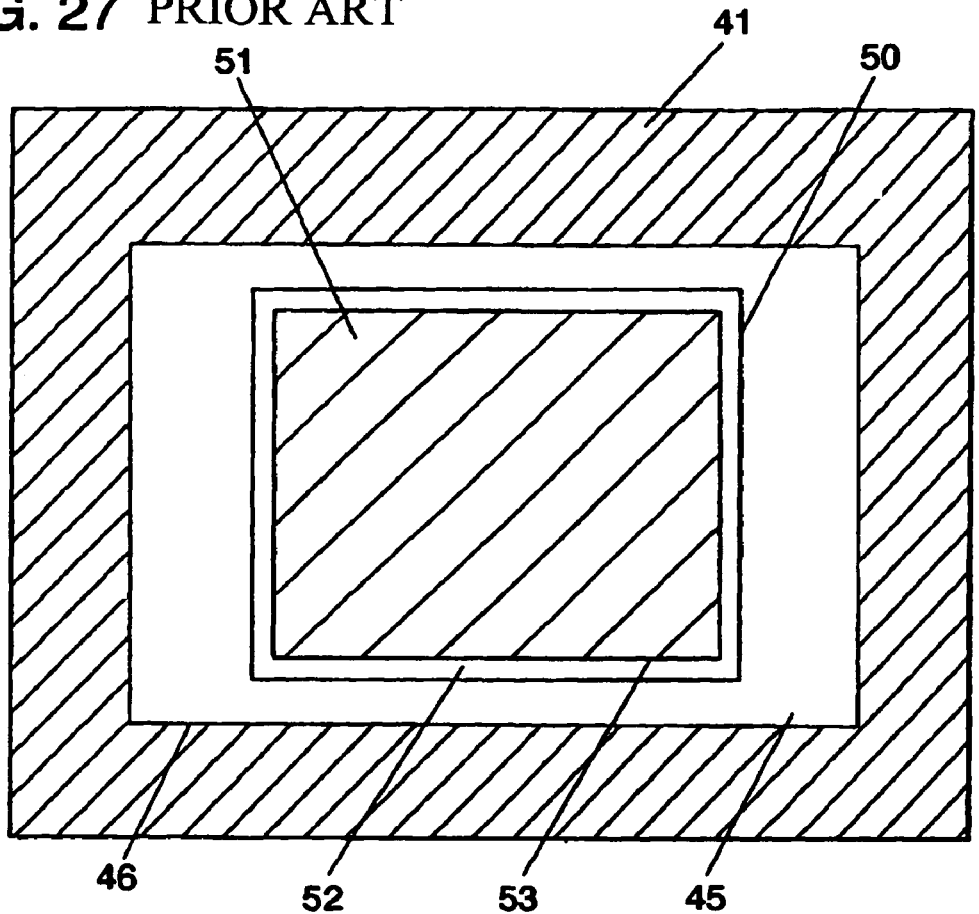
FIG. 27 is a configuration diagram of a conventional antenna module.
FIG. 28 is the experimental result comparing the radiation gain in the present invention and the radiation gain in the conventional system.
Figure 29:
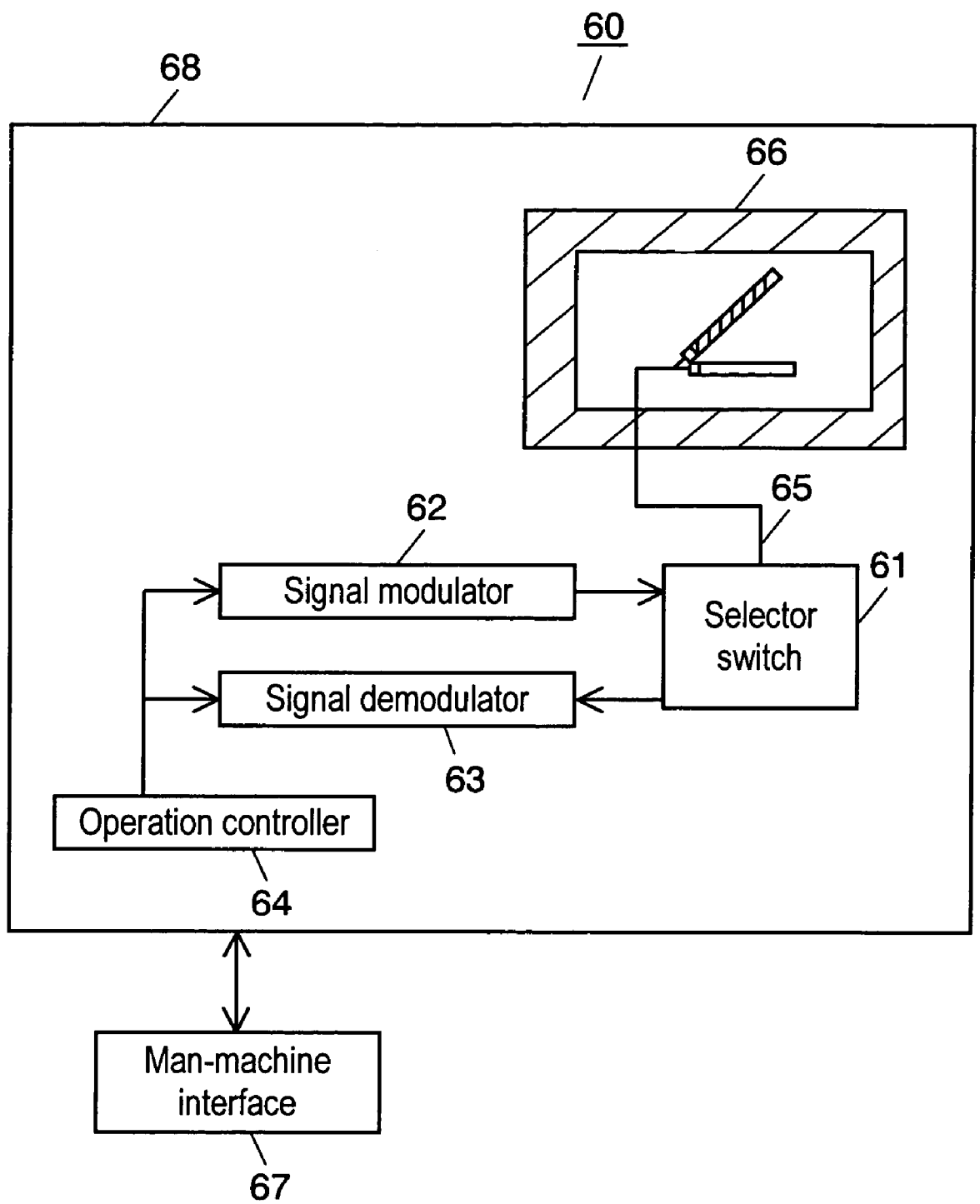
FIG. 29 is a block diagram of electronic equipment in the preferred embodiment 5 of the present invention.

The distribution of electric fields in the opening 45 is shown in FIG. 26.

Electric field E4 is an electric field at the tip end of helical antenna 42, and electric field E5 is an electric field at feeding end 44. Since the helical antenna 42 operates the same as $\lambda/4$ vertical antenna, the state of electric field is such that electric field E4 is maximized and E5 is minimized. Accordingly, the electric field is generated in a direction substantially vertical to one side 46 of the opening. Also, since one side 46 is the half-wavelength of electric waves transmitted and received, the size of electric field E6 is maximized at the portion of helical antenna 42 and minimized at the end. The difference in length of the arrow marks representing the electric field E6 in FIG. 26 is the difference in size of the electric field E6. Such electric field E6 generated in the opening 45 causes the transmitting and receiving electric waves of the helical antenna 42 to be resonated in the opening 45.

That is, the electric waves radiated from the helical antenna 42 are transferred to the opening 45. Then, since the length of one side 46 is nearly integer multiples of the half-wavelength of the electric waves transmitted and received, the all energy of the electric waves same in frequency as the electric waves transmitted and received is efficiently transferred. Because of the resonance in the opening 45, electric waves at same frequency as the resonance frequency are radiated from the opening 45. As a result, electric waves same in frequency as the signal applied to the helical antenna 42 are radiated into the outside space from the opening 45, and the helical antenna 42 functions as a primary radiator, while the opening 45 functions as a secondary radiator, causing the electric waves to be efficiently radiated.

Here, since the area of the opening 45 is larger as compared with the single unit of helical antenna 42, the electric power of the electric waves radiated is increased, enhancing the transmitting gains.

The receiving operation is reverse to the transmitting operation, in which the electric wave transferred from the outside space to the conductor 41 causes the generation of resonance in the opening 45, and due to the resonance generated, the electric waves from the outside space are transferred to the helical antenna 42. The same as in the transmitting operation, the area of the opening 45 is larger as compared with the single unit of helical antenna 42, and the receiving surface is increased, thereby enhancing the receiving gains. That is, the antenna module 40 brings about merits such that the transmitting and receiving gains are enhanced.

Further, suppose the conductor 41 is a plane coordinate, then the electric waves radiated from the opening 45 are radiated in a direction vertical to the plane coordinate, having a directional property vertically of the opening 45. The same holds true in the case of the receiving operation. Accordingly, it becomes possible to configure the antenna module 40 with high directionality, and in the case of building the antenna module 40 into electronic equipment, the transmitting and receiving performance can be enhanced by the installation utilizing the directionality.

Further, since the helical antenna 42 and the short side of opening 45 are in substantially parallel relation with each other, a capacity component is generated between them. By using the capacity component, impedance matching can be made without using any additional capacitor element or the like, and the purpose of size and cost reduction of the antenna module 40 can be achieved.

Incidentally, if the length of one side 46 of the opening greatly differs from the half-wavelength of the electric waves transmitted and received, the resonance frequency will become different from the original transmitting and receiving frequency, causing the energy loss to increase, and therefore, the length of one side 46 of the opening is preferable to be the half-wavelength or nearly integer multiples of it.

As described above, since the antenna module 40 is configured in that the helical antenna is installed in the opening 45 substantially vertically to one side 46 thereof, it is possible to realize a slot antenna which is smaller in size, lower in cost, higher in transmitting and receiving gains, and much better in directionality as compared with a conventional slot antenna using a rod antenna or patch antenna.

Next, the miniaturization of the antenna module related to the present invention will be described in comparison with the prior art.

In FIG. 27, a slot antenna realized by using a patch antenna is shown.

Patch antenna 50 is configured in that electrode pattern 51 is formed on the surface of substrate 52 that is generally oval in shape. With a signal supplied to the electrode pattern 51, the transmitting and receiving operation is executed. The length of one side 53 of the patch antenna 50 is required to be equivalent to the half-wavelength of the transmitting and receiving frequency, and as an example, it is required to be about 60 mm square in the case of a frequency of 2.5 GHz of a wireless LAN. Further, one side 46 of the opening 45 is desirable to be integer multiples of half-wavelength, odd multiples in particular, but one side of the patch antenna installed therein is already equivalent to the half-wavelength, and therefore, it is necessary to be three times the half-wavelength. Consequently, the size is required to be very large for configuring the antenna module that is a slot antenna.

On the other hand, as in the present invention, when the helical antenna 42 is used as a primary radiator, it becomes possible to determine the frequency in accordance with the inductance value of the helical conductor. Accordingly, the helical antenna is far smaller in size than a patch antenna in the case of the same frequency. For example, as an example of helical antenna 42 compatible with 2.5 GHz, a helical antenna of L2.2 mm×W2.2 mm×10 mm long is employed. Further, since one side of the opening is just equivalent to the half-wavelength, it is possible to realize a very small antenna module.

As described above, as compared with the conventional method using a patch antenna or the like, the antenna module of the present invention using a helical antenna is smaller in size. The same holds true in the case of using a rod antenna and also in the case of using other antennas.

The experimental result in the preferred embodiment 4 of the present invention will be described in the following.

FIG. 28 shows the experimental result compared with respect to transmitting and receiving gains.

In the convention method, the antenna module is formed of helical antenna 42 only. In the present invention, the antenna module is configured in that the helical antenna 42 described in the preferred embodiment 4 is installed in the opening 45. Each of these is supplied with a signal of the same electric power, and the radiated power is calculated by means of a three-dimensional analytic simulator. The radiated power is 0.63 W in the former, and 0.68 W in the latter. Therefore, it is clear that the gains of the antenna module of the present invention are enhanced. Further, it has been confirmed that increasing the shorter side (the side being substantially parallel with the helical antenna 42) of the opening 45 causes the area of the opening 45 to be increased, resulting in additional enhancement of the gains.

Thus, even in use of a single helical antenna, it is possible to enhance the transmitting and receiving gains and directionality by disposing the single helical antenna substantially vertically to one side at the opening of the mounting body surrounded by a conductor.

Preferred Embodiment 5

Figure 33:
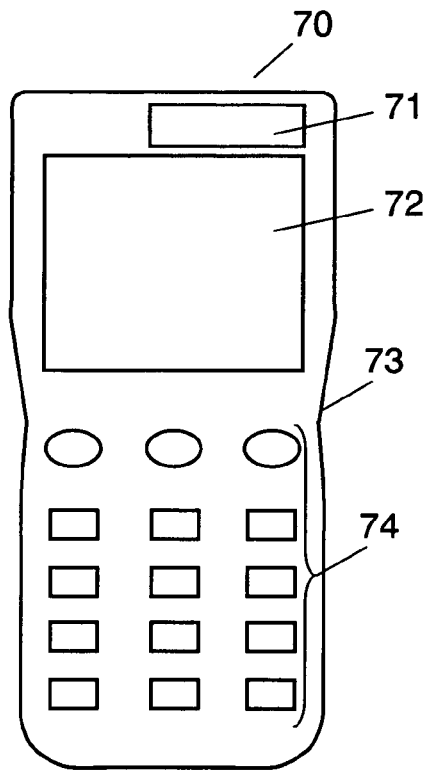
FIG. 33 is a front view of a portable telephone in the preferred embodiment 5 of the present invention.
Figure 34:
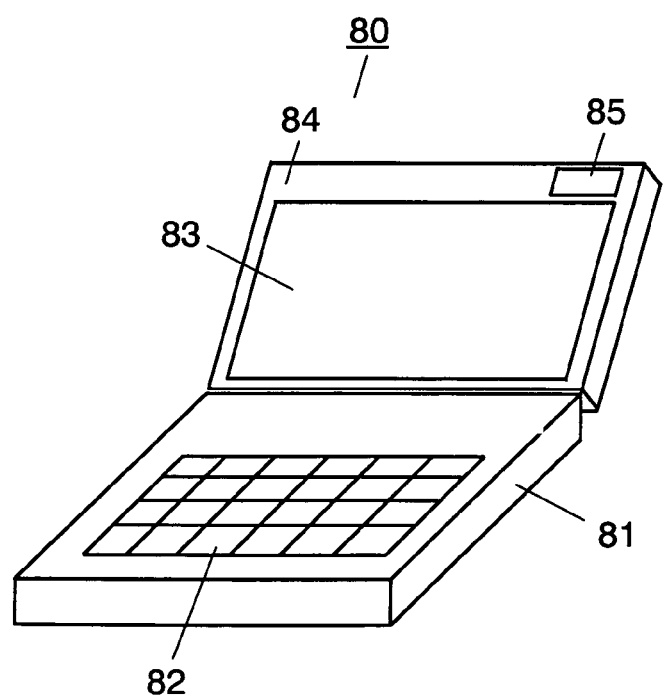
FIG. 34 is a perspective view of a notebook personal computer in the preferred embodiment 5 of the present invention.

FIG. 29, FIG. 30, FIG. 31, and FIG. 34 are block diagrams of electronic equipment (electric devices) in the preferred embodiment 5 of the present invention. FIG. 33 is a front view of a portable telephone in the preferred embodiment 5 of the present invention. FIG. 34 is a perspective view of a notebook personal computer in the preferred embodiment 5 of the present invention.

Casing 68 stores (holds) each component, such as an antenna module 66, which forms the exterior of electronic equipment 60.

Man-machine interface 67 is a connection between the user and electronic equipment such as input devices, a touch panel, keyboard or the like, and a display device. The man-machine interface 67 can be properly determined according to the specification, forming it on the surface of the casing or disposing it separately.

Electronic equipment 60 includes, for example, a notebook personal computer for wireless LAN communication, portable telephones, and PDA mounted with wireless function. Other members (such as a display device and display control) necessary for individual electronic equipment are sometimes separately configured.

Selector switch 61 operates to switch the signal direction for transmitting the signal to the antenna module 66 and for transferring the signal received from the antenna module 66 to the signal demodulator 63.

Signal modulator 62 operates to convert the data for transmission into a signal suited for wireless communication. For example, the signal modulator 62 first modulates digital data that can be represented by "1, 0" by a modulating system such as FSK (frequency shift keying) or PSK (phase shift keying). Subsequently, the transmitting frequency is multiplied by the carrier wave of same frequency in order to execute frequency up-conversion, and thereby, the modulated data is changed into a signal that can be transmitted. In this case, a low-pass filter is used as needed for noise reduction, and the frequency up-conversion is also executed in two steps. Or, in the case of analog communication, the analog signal is directly multiplied by the carrier wave in order to obtain a transmittable signal.

Signal demodulator 63 operates to demodulate necessary data from the electric wave signal received. The signal demodulator 63 first executes frequency down-conversion of the electric waves received. Subsequently, the signal modulated by FSK or PSK is processed in the reverse fashion, and thereby, digital data that can be represented by "1, 0" is extracted. The signal demodulator 63 executes regeneration processing of voice and data with respect to the digital data extracted. In the demodulation, a low-pass filter is used as needed for noise reduction of the signal, and the frequency down-conversion is also executed in several steps. Or, in the analog data communication, the frequency down-conversion is followed by demodulation executed by envelope detection or the like for detecting the electric power variation.

Also, it is preferable to execute diversity reception for enhancing the signal receiving performance, and also preferable to execute error detection and error correction as needed.

Operation controller 64 serves to control the operation of the signal modulator 62 and the signal demodulator 63. The operation controller 64 often includes a central processing unit (hereinafter called CPU), which executes the time series synchronization of the signal modulator 62 and the signal demodulator 63, execution of processing commands, and checking operation. The operation controller 64 sometimes includes a memory such as DRAM, cash memory or main memory, in addition to CPU for operation control.

Signal feeder line 65 is formed of a coaxial cable, copper wire, or wiring pattern on a substrate, and it can be realized easily at low cost by using wiring patterns.

The selector switch 61, signal modulator 62, signal demodulator 63, and operation controller 64 are preferably entirely or partially formed of integrated circuits (IC). In that case, along with the miniaturization of antenna module 66, there are merits such that the size reduction of electronic equipment mounted with the wireless communication function is further promoted. Moreover, with the electronic equipment 60 configured, it becomes easier to build the antenna module into a portable telephone or notebook personal computer which requires high-density mounting.

Also, it is preferable to enhance the flexibility for building into electronic equipment by setting up a module with only a part of the antenna module 66, selector switch 61, signal modulator 62, signal demodulator 63, operation controller 64, and signal feeder line 65.

Figure 30:
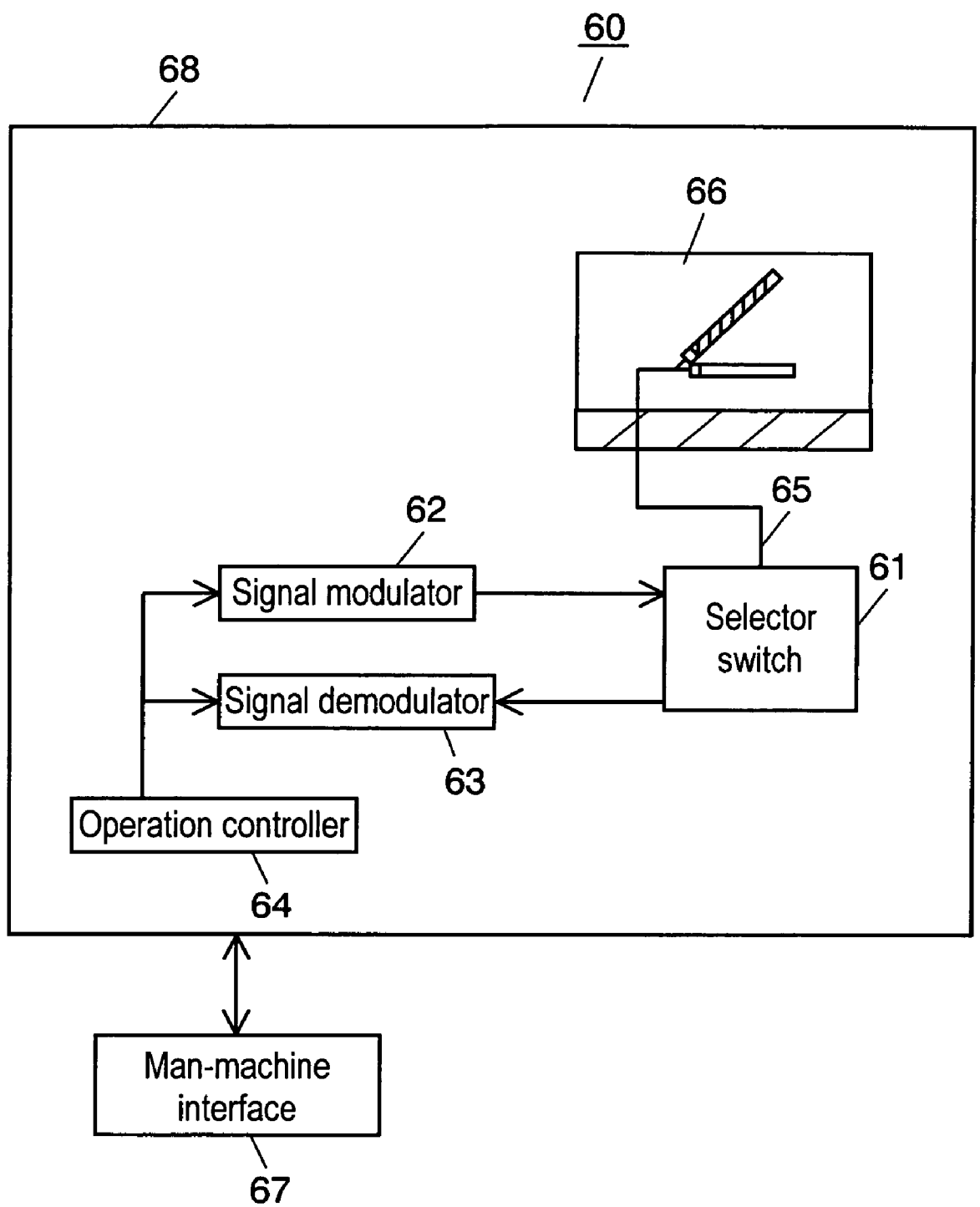
FIG. 30 is a block diagram of electronic equipment in the preferred embodiment 5 of the present invention.
Figure 31:
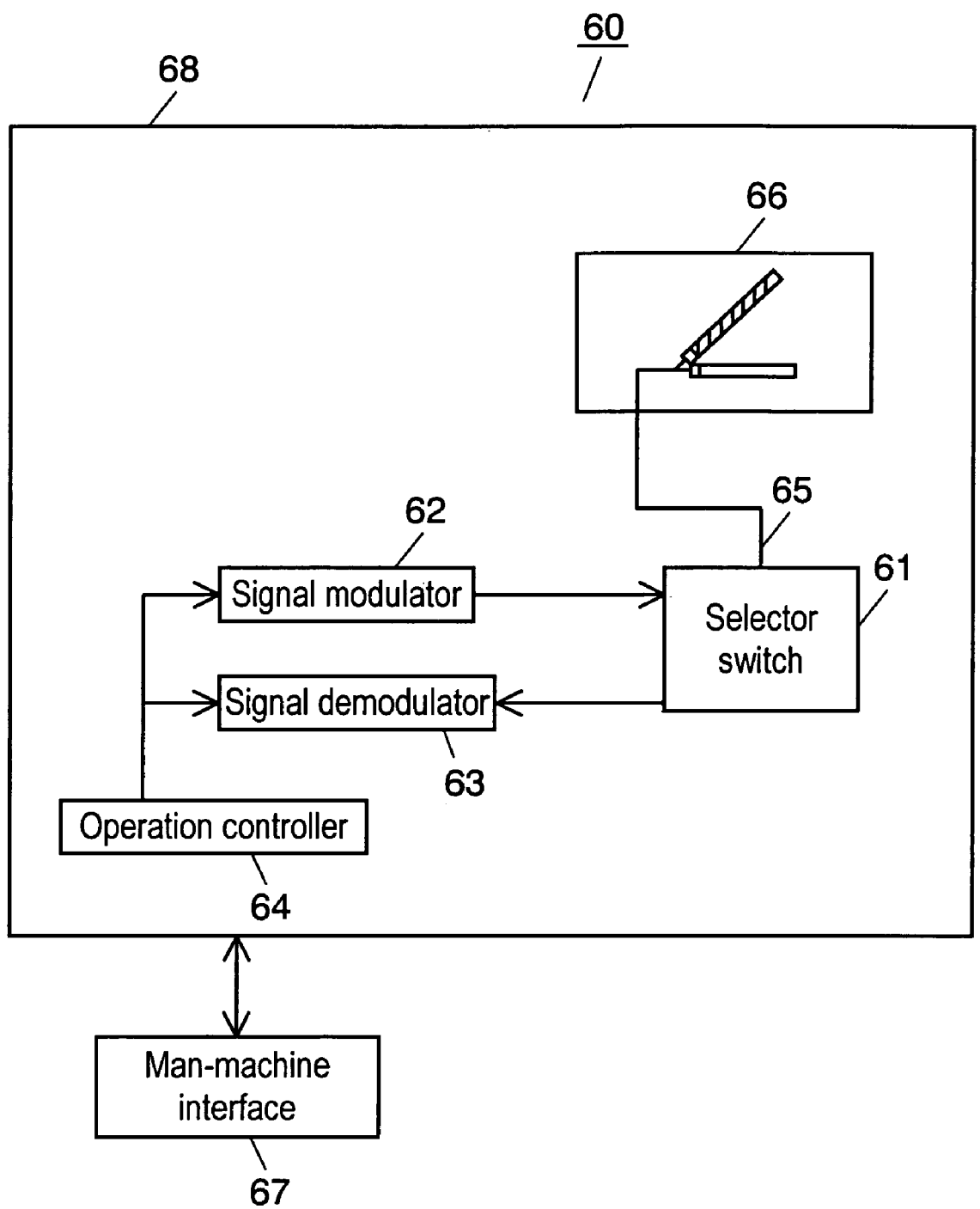
FIG. 31 is a block diagram of electronic equipment in the preferred embodiment 5 of the present invention.
Figure 32:
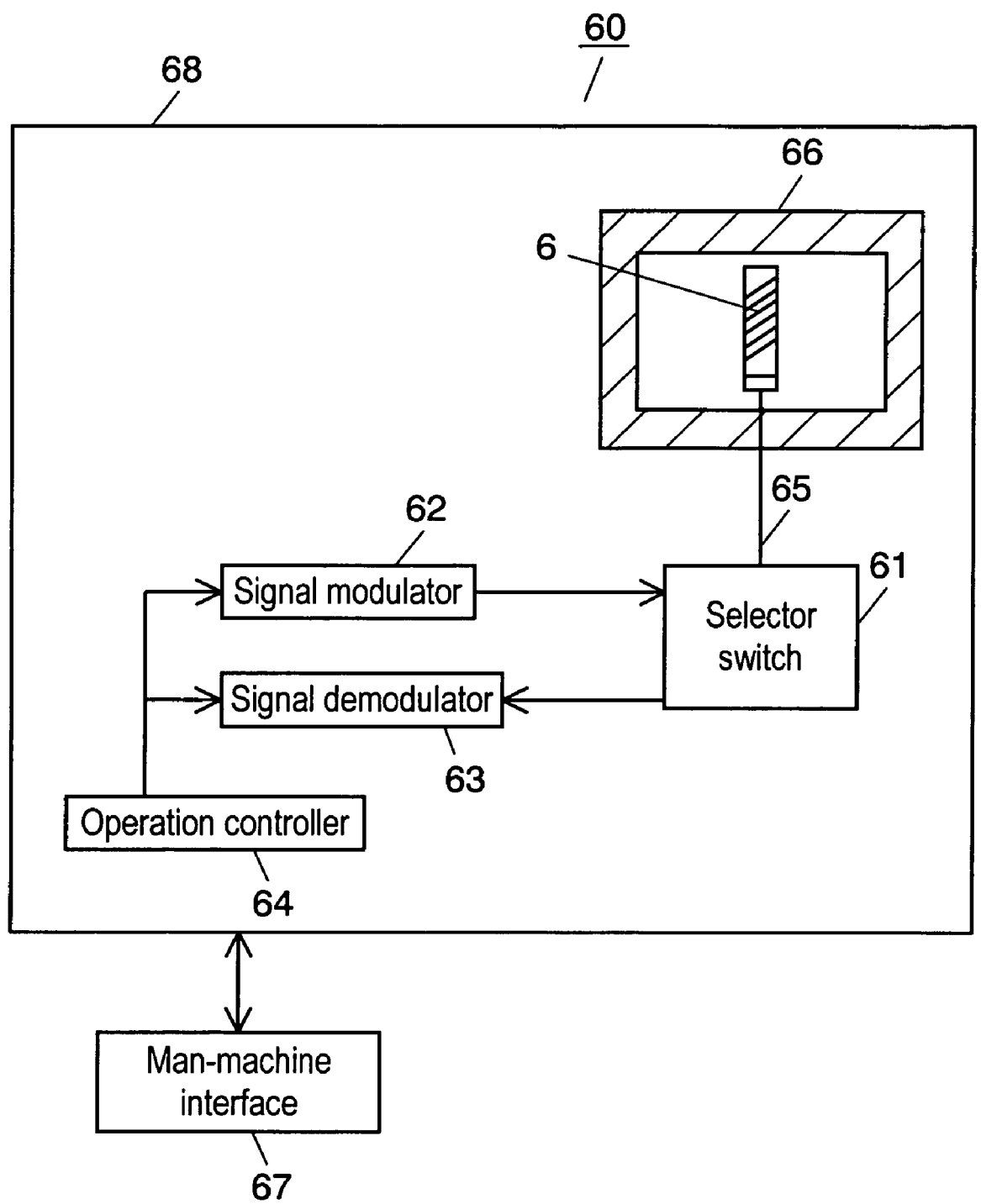
FIG. 32 is a block diagram of electronic equipment in the preferred embodiment 5 of the present invention.

Also, the antenna module 66 is the one described in the preferred embodiment 3, but it is also preferably the ones described in the preferred embodiments 1, 2 and 4. These are shown in FIG. 30, FIG. 31 and FIG. 32. In FIG. 30, the antenna module 66 in which there exists a conductor under the antenna element is used, and in FIG. 31, the antenna module 66 in which there exists no conductor at the antenna element is used. In FIG. 32, the antenna module 66 described in the preferred embodiment 4 is used.

Even in the above case, the transmitting and receiving gains of the antenna module are high as described in the preferred embodiments 1 to 4, and electronic equipment capable of very high-performance wireless communication may be realized. Also, although it is not shown, broadband communication can be realized by forming an additional conductor at the open portion of the antenna (helical antenna) in the antenna module 66, which is appropriate for large-quantity data communication.

Also, as an example of the electronic equipment, the antenna module of the present invention which is applied to a portable telephone is shown in FIG. 33.

Portable telephone 70 comprises a casing 73, antenna module 71, display 72, operation keys, 74, and the like. Since the antenna module 71 is built into the casing 73, the portable telephone 70 is not required to have a type of antenna that excessively protrudes. Further, even with the antenna module 71 built into a portable telephone, it is possible to assure sufficient transmitting and receiving performance because of the high transmitting and receiving gain performance of the antenna module 71.

Similarly in FIG. 34 is shown the antenna module of the present invention applied to a notebook personal computer. The notebook personal computer 80 comprises first casing 81, keyboard 82, display screen 83, second casing 84, and antenna module 85. The antenna module 85 is mounted at the peripheral edge of the second casing 84. Liquid crystal, CRT, organic EL display, plasma display and the like are preferably used for the display screen 83.

The notebook personal computer 80 is, for example, used for wireless communication by wireless LAN. The antenna module 85 is very high in transmitting and receiving gains as described in the preferred embodiments 1 to 4. Accordingly, sufficient transmitting and receiving performance can be achieved, and as broadband is realized as needed, large-quantity data communication can be realized. Also, it can be built into electronic equipment without enlarging the sizes of the equipment.

Naturally, it is preferably used for mobile apparatus or network apparatus such as an electronic note other than these.

Preferred Embodiment 6

In the preferred embodiment 6, the manufacturing process of an helical antenna is described.

Figure 35:
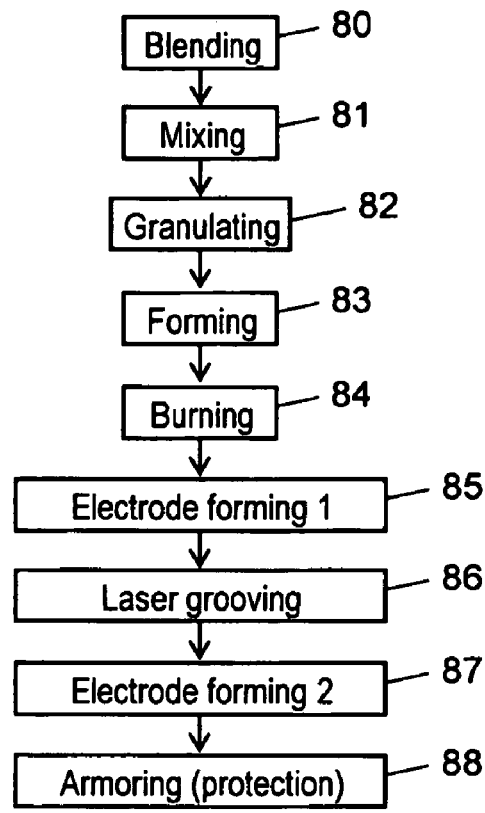
FIG. 35 is a manufacturing process diagram of a helical antenna in the preferred embodiment 6 of the invention.
Figure 36:
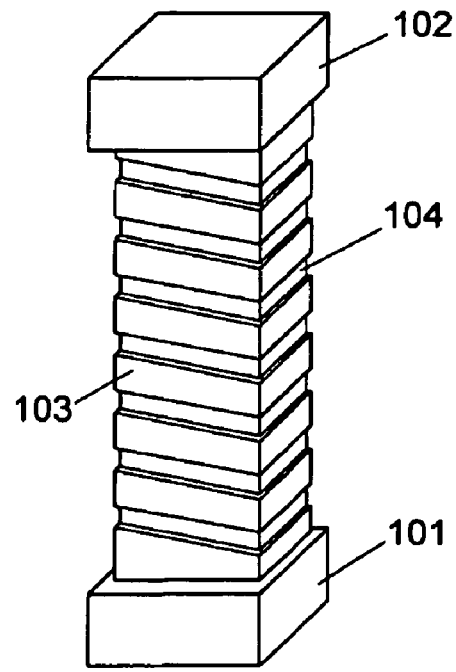
FIG. 36 is a perspective view of an antenna element in the prior art.
Figure 37:
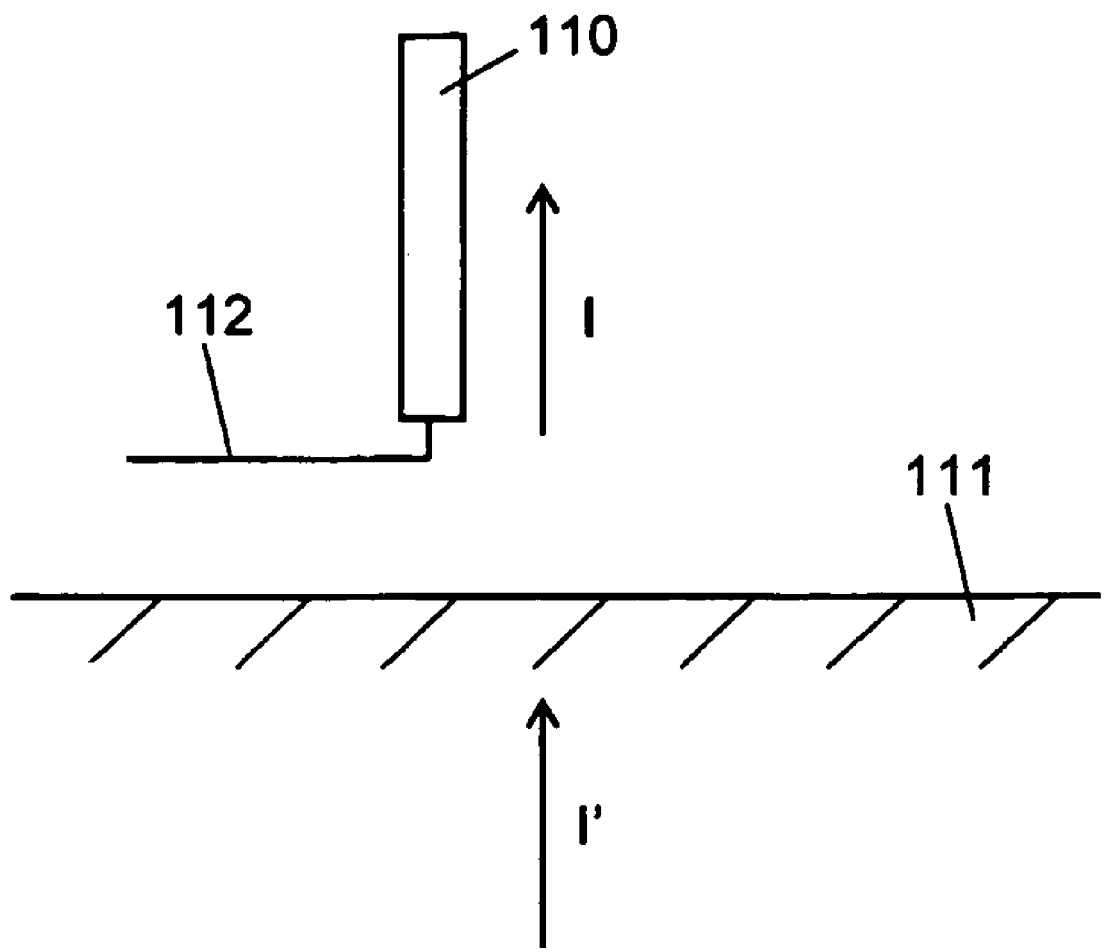
FIG. 37 is a diagram of relationship between an antenna element and a ground surface in the prior art.

FIG. 35 is a manufacturing process chart of an helical antenna in the preferred embodiment 6 of the present invention.

First, a ceramic material containing alumina as main component is blended. As other than such alumina-based material, forsterite, zirconia, tin, titanium-based, magnesium titanate-based, calcium titanate-based, and barium titanate-based materials are blended as needed. As an example of blending ratio, $Al_2O_3$ by 92 wt % or over, $SiO_2$ by 6 wt % or less, MgO by 1.5 wt % or less, $Fe_2O_3$ by 0.1 wt % of less, and $Na_2O$ by 0.3 wt % or less are adopted. Mixing of impurities is naturally unavoidable. The weight of each material is measured, and the measured materials are blended. Such treatment is executed in blending process 80.

The blended materials are mixed in a mixing oven or the like. The materials are sufficiently mixed by stirring or the like. Such treatment is executed in mixing process 81.

Each of the mixed materials is subjected to the adjustment of grain diameters at granulating process 82 in order to make the grain diameter of the material as desired. If the grain diameter is too large, there arises a problem of weakening of the mold strength. Therefore, the treatment is executed in the granulating process 82 for obtaining appropriate grain diameter.

The material with grain diameter adjusted and mixed in the granulating process 82 is formed into a proper shape in forming process 83. The material is thrown into a die or the like having a proper shape and is formed under pressures ranging from 2 tons to 5 tons. The forming shape is preferably suited for a substrate with respect to shape and size.

The formed element is burnt in burning process 84 in order to assure the required strength. The burning temperature used ranges from 1500° C. to 1600° C., and the burning time is preferable to be about 1 to 3 hours. It is of course preferable to change the burning temperature and the burning time as needed in accordance with the material, the size and shape of the element.

On the surface of the burnt substrate is formed a conductive layer in electrode forming 1 process 85. As an example, a copper layer is formed by non-electrolytic plating, evaporation or sputtering. Besides this, gold, platinum, paradium, silver, tungsten, titanium, nickel, tin or the like, is formed by non-electrolytic plating, evaporation or sputtering.

After a conductive layer is formed on the substrate in the electrode forming 1 process 85, a spiral groove is formed in laser grooving process 86 in order to form a helical conductor. In such laser grooving, trimming grooves are formed by applying a laser beam to the substrate provided with a conductive layer and installed on a rotary base by means of a YAG laser, carbonic acid gas laser, or excimer laser.

On the substrate formed with a helical conductor in the laser grooving process 86 is formed a conductive layer as an outer layer in electrode forming 2 process 87. Copper, nickel, tin or the like is formed by electrolytic plating. No electrolytic-plated layer is formed on portions formed with trimming grooves because they are free of non-electrolytic-plated layer, and in the electrode forming 2 process 87, a new conductive layer is formed on portions other than trimming grooves. Accordingly, the conductivity of the conductive layer and the impact resistance in mounting will be improved.

Finally, a protective layer is formed in armoring process 88 in order to manufacture a chip antenna. As a protective layer, a tube-like protective layer, paste-form protective layer, or electro-formed layer is employed as described in the preferred embodiment 1.

What is claimed is:

1. An electronic device comprising:
   a mounting body having a conductive area and a non-conductive area;
   an antenna element mounted on the mounting body, the antenna element including a first antenna having a feeder portion and a conductor having a feeder portion, wherein the feeder portions are adapted to receive a common current;
   a signal modulator for modulating transmitting signals;
   a signal demodulator for demodulating receiving signals;

a controller operable to control processing of at least one of the signal modulator and the signal demodulator;

a man-machine interface for handling commands and displaying; and a casing holding at least the antenna element, the signal modulator, the signal demodulator, and the controller, wherein the antenna element is mounted on the non-conductive area such that the conductor is located between the first antenna and the conductive area.

2. The electronic device of claim 1, wherein the conductor is a second antenna.

3. The electronic device of claim 2, wherein the first and second antennas are disposed at an acute angle with respect to each other.

4. The electronic device of claim 3, wherein the acute angle is in a range from 5 degrees to 60 degrees.

5. The electronic device of claim 2, wherein at least one of the first and second antennas is a helical antenna.

6. The electronic device of claim 5, wherein the helical antenna comprises:

a substrate;

a helical conductor provided on the substrate; and a pair of terminals provided at the substrate.

7. The electronic device of claim 6, wherein the helical conductor is a trimming groove formed in the substrate covered with a conductive layer.

8. The electronic device of claim 6, further comprising:

a protective layer formed so as to cover at least the helical conductor.

9. The electronic device of claim 2, wherein one of the first and second antennas is adapted to be fed current having a different phase than another of the first and second antennas.

10. The electronic device of claim 1, wherein the conductor is disposed adjacent to an edge of the conductive area.

11. The electronic device of claim 2, further comprising:

an additional conductor formed at an open end of one of the first and second antennas.

* * * * *